(12) United States Patent
Odi et al.

(10) Patent No.: US 9,310,137 B2
(45) Date of Patent: Apr. 12, 2016

(54) UNIFIED COOLING IN MULTIPLE POLYOLEFIN POLYMERIZATION REACTORS

(71) Applicant: Chevron Phillips Chemical Company, LP, The Woodlands, TX (US)

(72) Inventors: Timothy O Odi, Kingwood, TX (US); Anurag Gupta, Sugar Land, TX (US); Ralph W Romig, Kingwood, TX (US)

(73) Assignee: Chevron Phillips Chemical Company, LP, The Woodlands, TX (US)

(*) Notice: Subject to any disclaimer, the term of this patent is extended or adjusted under 35 U.S.C. 154(b) by 375 days.

(21) Appl. No.: 13/872,746

(22) Filed: Apr. 29, 2013

(65) Prior Publication Data

US 2014/0318743 A1    Oct. 30, 2014

(51) Int. Cl.
| | |
|---|---|
| C08F 2/01 | (2006.01) |
| F28D 15/00 | (2006.01) |
| B01J 19/18 | (2006.01) |
| F28D 7/10 | (2006.01) |
| C08F 2/00 | (2006.01) |
| C08F 10/02 | (2006.01) |

(52) U.S. Cl.
CPC ............. *F28D 15/00* (2013.01); *B01J 19/1837* (2013.01); *B01J 19/1862* (2013.01); *C08F 2/001* (2013.01); *C08F 2/01* (2013.01); *F28D 7/106* (2013.01); *B01J 2219/00051* (2013.01); *B01J 2219/00094* (2013.01)

(58) Field of Classification Search
CPC .................. F28D 15/00; B01J 19/1837; B01J 2219/00094; C08F 2/01
USPC .......................... 165/104.11; 526/65; 422/134
See application file for complete search history.

(56) References Cited

U.S. PATENT DOCUMENTS

| | | | |
|---|---|---|---|
| 5,235,852 A | 8/1993 | Toedtli | |
| 6,235,852 B1 * | 5/2001 | Hess et al. | ...................... 526/65 |
| 6,753,387 B1 | 6/2004 | Tait et al. | |
| 7,033,545 B2 | 4/2006 | Kufeld et al. | |
| 8,273,299 B2 | 9/2012 | Parisel et al. | |
| 2009/0228259 A1 | 9/2009 | Gupta et al. | |

FOREIGN PATENT DOCUMENTS

WO    2009101008    8/2009

* cited by examiner

*Primary Examiner* — Fred M Teskin
(74) *Attorney, Agent, or Firm* — Chamberlain, Hrdlicka

(57) ABSTRACT

A system and method for a polyolefin reactor temperature control system having a first reactor temperature control path, a second reactor temperature control path, and a shared temperature control path. The shared temperature control path is configured to combine and process coolant return streams, and to provide coolant supply for the first reactor temperature control path and the second reactor temperature control path.

65 Claims, 13 Drawing Sheets

UNIFIED COOLING IN MULTIPLE POLYOLEFIN POLYMERIZATION REACTORS

BACKGROUND

1. Field of the Invention

The present invention relates generally to polyolefin production with multiple polymerization reactors and, more particularly, to employing individual reactor temperature control having shared cooling capacity for the multiple polymerization reactors.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream and, once added, suspended in the fluid medium within the reactor. Unlike the monomers, catalysts are generally not consumed in the polymerization reaction. Moreover, an inert hydrocarbon, such as isobutane, propane, n-pentane, i-pentane, neopentane, n-hexane, and/or heptane, and so on, may be added to the reactor and utilized as a diluent to carry the contents of the reactor. However, some polymerization processes may not employ monomer as the diluent, such as in the case of selected examples of polypropylene production where the propylene monomer itself acts as the diluent. Nevertheless, the diluent may mix with fluff and other components in the reactor to form a polymer slurry. In general, the diluent may facilitate circulation of the polymer slurry in the reactor, heat removal from the polymer slurry in the reactor, and so on.

The slurry discharge of the reactor typically includes the polymer fluff as well as non-polymer components such as unreacted olefin monomer (and comonomer), diluent, and so forth. This discharge stream is generally processed, such as by a diluent/monomer recovery system (e.g. flash vessel or separator vessel, purge column, etc.) to separate the non-polymer components from the polymer fluff. The recovered diluent, unreacted monomer, and other non-polymer components from the recovery system may be treated and recycled to the reactor, for example. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

In some circumstances, to increase capacity of a polyolefin polymerization line or to achieve certain desired polymer characteristics, more than one polymerization reactor may be employed, with each reactor having its own set of conditions. In certain examples, the reactors (e.g., loop reactors) may be connected in series, such that the polymer slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymer product is monomodal, bimodal, or multimodal, and having polyolefin portions of different densities, and so on.

The polymerization in a single or multiple reactors is generally exothermic, or heat-generating, and is typically performed in closed systems where temperature and pressure can be regulated to control production. As with any such closed system where heat is generated, some means should be supplied to remove heat and thus to control the polymerization temperature. For loop reactors and other polymerization reactors, a cooling or coolant system is typically used to remove heat.

Variations in reactor feedstocks, utility supplies, and reaction kinetics induce variations in the reactor (polymerization) temperature which may be mitigated by the reactor temperature control scheme and the reactor coolant system. The control scheme and coolant system should also accommodate reactor upsets caused, for example, by undesirable slug feed of reactants or by rapidly changing heat transfer behavior in a fouling reactor.

Unfortunately, problems may be experienced that cause the coolant system to remove too little heat or too much heat from the reactor. Poor temperature control in the reactor increases the cost to manufacture polyolefin. In particular, poor temperature control in the reactor results in a wider design basis for coolant system equipment and thus increases equipment costs. Furthermore, swings in reactor temperature impact reactor stability and can lead to a reactor foul and/or unplanned shutdown. Additionally, polymerization temperature affects the properties of the polyolefin and thus poor control of reactor temperature cause off-spec production of polyolefin. Moreover, employment of multiple polymerization reactors in a polyolefin reactor system may add complexity and cost of the coolant system and reactor temperature control.

The competitive business of polyolefin production drives manufacturers in the continuous improvement of their processes in order to improve operability and product quality, lower production costs, and so on. In an industry where billions of pounds of polyolefins are produced per year, small incremental improvements, such as in reducing capital and operating costs associated with reactor cooling while maintaining effective temperature control and product quality, can result in a more attractive technology and economic benefit including greater price margins and netback, and so forth.

SUMMARY OF THE INVENTION

An aspect of the invention relates to a polyolefin reactor temperature control system including: (a) a first reactor temperature control path for: a first control feed stream to split into at least (1) a first cooler zone feed stream to pass through a first cooler zone to produce a first cooler zone output stream and (2) a first cooler zone bypass stream; a first treated stream having a first treated stream temperature and comprising the first cooler zone output stream and the first cooler zone bypass stream; and a first recycle stream comprising the first treated stream after the first treated stream has exchanged energy with a first polyolefin reactor. The reactor temperature control system further includes (b) a second reactor temperature control path for: a second control feed stream to split into at least (1) a second cooler feed stream to pass through a second cooler zone to produce a second cooler zone output stream and (2) a second cooler zone bypass stream; a second treated stream having a second treated stream temperature and comprising the second cooler zone output stream and the second cooler zone bypass stream; and a second recycle stream comprising the second treated stream after the second treated stream has exchanged energy with a second polyolefin reactor. Lastly, included is (c) a shared temperature control path configured to: combine the first and second recycle streams to form a combined recycle stream; process the combined recycle stream through shared system equipment to form a shared output stream; and split the shared output stream into the first control feed stream and the second control feed stream.

Another aspect of the invention includes a method of controlling reactor temperature, including: splitting a first control feed stream into at least (1) a first cooler zone feed stream through a first cooler zone to produce a first cooler zone output stream and (2) a first cooler zone bypass stream; combining the first cooler zone output stream and the first cooler zone bypass stream to give a first treated stream having a first treated stream temperature; recycling a first return stream comprising the first treated stream after the first treated stream has exchanged energy with a first polyolefin reactor; splitting a second control feed stream into at least (1) a second cooler zone feed stream through a second cooler zone to produce a second cooler zone output stream and (2) a second cooler zone bypass stream; combining the second cooler zone output stream and the second cooler zone bypass stream to give a second treated stream having a second treated stream temperature; recycling a second return stream comprising the second treated stream after the second treated stream has exchanged energy with a second polyolefin reactor; combining the first and second return streams to form a combined return stream; processing the combined return stream through shared system equipment to form a shared output stream; and splitting the shared output stream into the first control feed and the second control feed.

Yet another aspect of the invention relates to polyolefin reactor system, having a total reactor system production rate, including: a first polymerization reactor having a first reactor production rate; a second polymerization reactor having a second reactor production rate; and a reactor temperature control system including a first reactor temperature control path, a second reactor temperature control path, and a shared temperature control path including a pump having a single pump discharge rate split between the first reactor temperature control path and the second temperature control path, wherein a ratio of the total reactor system production rate to the single pump discharge rate is greater than 0.004 pounds polyethylene per pound of coolant (treated water).

Yet another aspect of the invention relates to a reactor system including: a first polyolefin reactor; a second polyolefin reactor; and a reactor temperature control system having a coolant pump. The coolant pump is configured to: provide coolant supply to the first polyolefin reactor through a first cooler and a first bypass line disposed operationally in parallel to the first cooler; provide coolant supply to the second polyolefin reactor through a second cooler and a second bypass line disposed operationally in parallel to the second cooler; and receive coolant return from the first polyolefin reactor and coolant return from the second polyolefin reactor.

Lastly, yet another aspect of the invention relates to a method including: polymerizing olefin in a first reactor to form a first polyolefin; polymerizing olefin in a second reactor to form a second polyolefin; providing coolant supply via a coolant pump to the first reactor through a first cooler and a first bypass line disposed operationally in parallel to the first cooler; providing coolant supply via the coolant pump to the second reactor through a second cooler and a second bypass line disposed operationally in parallel to the first cooler; and receiving coolant return at the coolant pump from the first and second reactors.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

Figure 1:
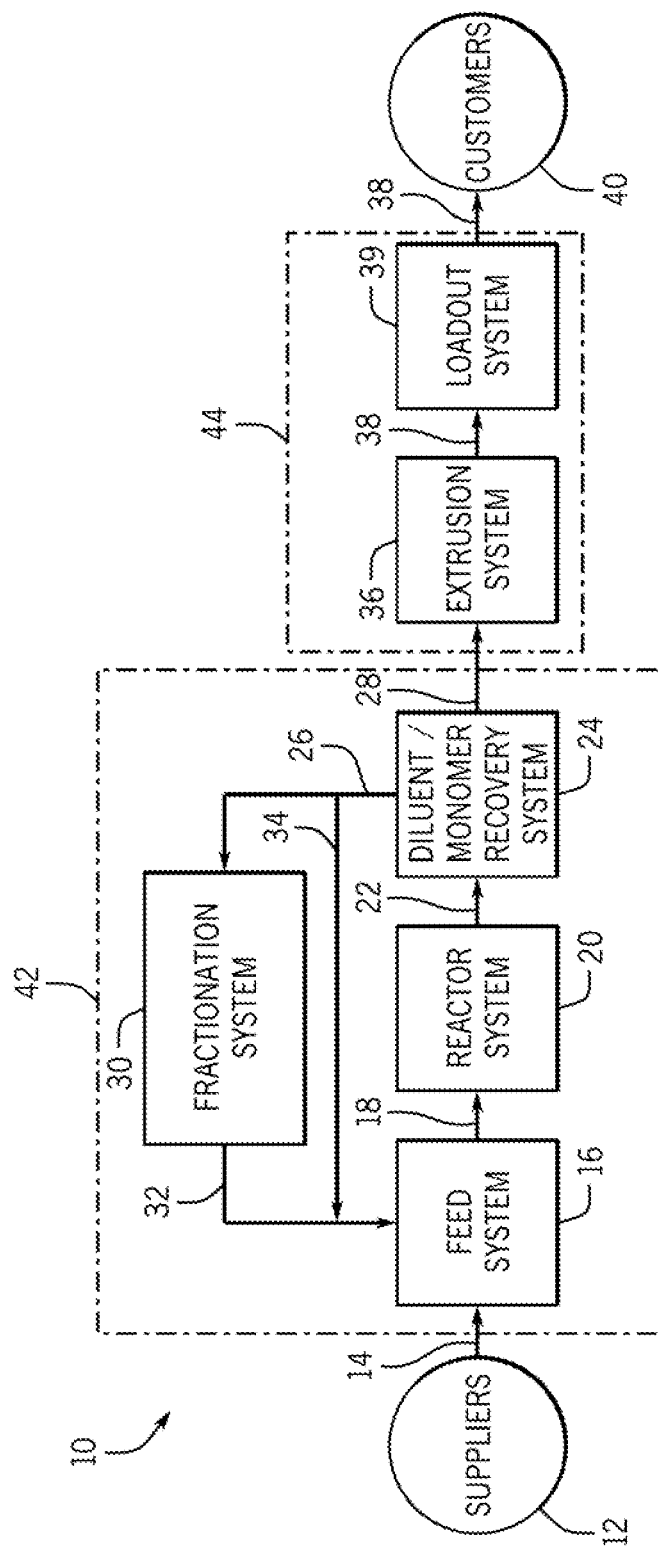
FIG. 1 is a block flow diagram depicting an exemplary polyolefin production system for producing polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

The present techniques accommodate the production of the same or different polyolefins in respective polymerization reactors in series or parallel. The polyolefin produced in the reactors may be the same or different with respect to polymer density, molecular weight, and so on. To improve such production, the present techniques address temperature control of the multiple polymerization reactors in the reactor system. The techniques address the precision of the temperature control, and the associated capital and operating costs of the coolant system used to implement the reactor temperature control.

Example temperature control and associated coolant systems are discussed below in Section III. The techniques uniquely employ a common or shared coolant pump to provide respective coolant supply to the multiple polymerization reactors in the polyolefin reactor system. Advantageously, such a unified or shared motive force for coolant supply may reduce capital and operating costs of the coolant system.

Further, the coolant supply from the shared pump is split into dedicated cooling for the respective reactors, thereby providing more precise temperature control of the reactors, such as within a desired tolerance of +/−0.25° F., for example. Thus, the coolant system includes a common or shared portion (motive force) supplying the reactors, as well as individual or dedicated portions (cooling and temperature control) for the respective reactors.

In operation, a control scheme may direct the coolant system to maintain the reactor temperature at a desired set point. The temperature control may involve a cascade control scheme, or in other words, a primary controller (i.e., that maintains reactor temperature) that directs a slave controller (i.e., that adjusts coolant temperature). The slave controller may send an output to adjust the position of one or more valves in the coolant system.

To achieve desired polymer characteristics in polyolefin production, more than one polymerization reactor may be employed, with each reactor having its own set of conditions. The reactors (e.g., loop reactors) may be connected in series, such that all or at least a portion of the polymer fluff slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymerized in each respective reactor may have a different molecular weight, different density, and so on. In the case of two reactors in series, two polyolefin polymers (e.g., one polymerized in the first reactor and the other polymerized in the second reactor), each having a different molecular weight fraction or different density, for instance, may be combined into one polymer product discharging from the second (final) reactor.

Thus, in polyolefin production with polymerization reactors in series, the reactors can be operated to produce different polyolefin polymers in each reactor. For example, the olefin monomer may be polymerized in the first reactor to produce a high molecular-weight polyolefin and having a low or high polymer density, and the olefin monomer polymerized in the second reactor to produce a low molecular-weight polyolefin and having a low or high polymer density. On the other hand, the olefin monomer may be polymerized in the first reactor to produce a low molecular-weight polyolefin and having a low or high polymer density, and the olefin monomer polymerized in the second reactor to produce a high molecular-weight polyolefin and having a low or high polymer density. Further, similar molecular weight polyolefin may be produced in each reactor but with the polyolefin density or other properties being different in each reactor.

In a certain examples with two polymerization reactors (e.g., loop reactors) in series, a low molecular-weight high-density polyethylene (LMW HDPE) is produced in one reactor and a high molecular-weight linear low-density polyethylene (HMW LLDPE) produced in the other reactor. Thus, the combined final product is a bimodal polyethylene discharging from the final (second reactor). A chain transfer agent (e.g., hydrogen) is fed to the reactor polymerizing the LMW HDPE to terminate polymer chain growth in the addition polymerization to facilitate production of the LMW HDPE in that reactor. Therefore, as may be deduced from the foregoing discussion, the cooling requirements for the reactors may vary considerably.

Indeed, as for maintaining the polymerization temperature in the reactors, the cooling requirements of the respective reactors may vary considerably depending on the type or grade and amount of polyolefin being produced. In other words, the amount of heat generated in a reactor and, thus, the cooling required may be different across different grades or types and production rates of polyolefin, and between two reactors in a given reactor system, such as in bimodal production. In fact, the amount of chain transfer agent added, for example, and the degree of polymerization, may generate more or less heat of reaction. Again, the present reactor temperature control and associated coolant system are discussed in more detail below in Section III.

Lastly, while the present discussion may focus on two reactors in series, the present techniques may be applicable to more than two reactors in series. Further, the techniques may apply to two or more reactors in parallel, or any combinations of series and parallel reactors. Further, various combinations of molecular weights and comonomer additions in monomodal, bimodal, or multimodal polyolefin (e.g., polyethylene, polypropylene, etc.) may be applicable.

I. Polyolefin Production Overview

Turning now to the drawings, and referring initially to FIG. 1, a block diagram depicts an exemplary production system 10 for producing polyolefin such as polyethylene, polypropylene, and their copolymers, etc. The exemplary production system 10 is typically a continuous operation but may include both continuous and batch systems. An exemplary nominal capacity for the exemplary production system 10 is about 600-1600 million pounds of polyolefin produced per year. Exemplary hourly design rates are approximately 65,000 to 200,000 pounds of polymerized/extruded polyolefin per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts such as, triethylboron, organoaluminum compounds, methyl aluminoxane (MAO), triethylaluminum (TEAl), borates, TiBAL, etc., and activators such as solid super acids, and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the feed system 16, the feedstocks 14 may be treated or processed prior to their introduction as feed 18 into the polymerization reactor system 20. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams.

In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20. Moreover, a given feed system 16 may be dedicated to a particular reactor or to multiple reactors disposed/operated in series or parallel. Further, a feed system 16 may receive recycle components (e.g., diluent) from one or more downstream processing systems.

The reactor system 20 may have one or more reactor vessels, such as liquid-phase or gas-phase reactors. If multiple reactors are employed, the reactors may be arranged in series, in parallel, or in other combinations or configurations. Moreover, multiple reactors arranged and operated in series may be shifted in operation to a parallel or independent operation.

In the polymerization reactor vessels, one or more olefin monomers and optionally comonomers are polymerized to form a product polymer particulates, typically called fluff or granules. In one example, the monomer is ethylene and the comonomer is 1-hexene. In another example, the monomer is propylene and the comonomer is ethylene. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers and comonomers, a catalyst that facilitates polymerization of the ethylene monomer is typically added to the reactor. The catalyst may be a particle suspended in the fluid medium within the reactor. In general, Ziegler catalysts, Ziegler-Natta catalysts, metallocene catalysts, chromium catalysts, nickel catalysts, post-metallocene and other well-known polyolefin catalysts, as well as co-catalysts, may be used. Typically, an olefin-free diluent or mineral oil, for example, is used in the preparation and/or delivery of the catalyst in a feed conduit that taps into the wall of the polymerization reactor. Further, diluent may be fed into the reactor, typically a liquid-phase reactor.

The diluent may be an inert hydrocarbon that is liquid at reaction conditions, such as isobutane, propane, n-butane, n-pentane, i-pentane, neopentane, n-hexane, n-heptane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on. Moreover, in examples of polypropylene production, the propylene monomer itself may act as a diluent.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor. Lastly, as discussed in more detail in Section III below, the reactor system 20 typically includes a coolant system to facilitate control of temperature in the polymerization reactors.

The discharge of polyolefin fluff product slurry 22 of the reactors from system 20 may include the polymer polyolefin fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor system (e.g., the final reactor in a series of reactors) through the discharge nozzle may be subsequently processed, such as by a diluent/monomer recovery system 24. The fluff product slurry 22 may also be called a reactor product discharge slurry, a reactor product discharge, or a reactor discharge, etc. Thus, depending on context, a "reactor discharge" may refer to the fluff slurry exiting the reactor and/or to the physical configuration (e.g., reactor wall tap or opening, nozzle, conduit, valve if any, etc.) discharging the fluff slurry.

Furthermore, it should be noted that the liquid (e.g., diluent) in fluff product slurry 22 generally partially or fully vaporizes through a flash line including a flash line heater (not shown) downstream of the reactor in route to the diluent/monomer recovery system 24. As discussed below, such vaporization may be due to decreasing pressure through the flash line, and/or due to heat added by the flash line heater (e.g., a conduit with a steam or steam condensate jacket). The diluent/monomer recovery system 24 may process the fluff product slurry 22 (whether the liquid in the slurry 22 is partially or fully vaporized in the flash line) from the reactor system 20 to separate non-polymer components 26 (e.g., diluent and unreacted monomer) from the polymer fluff 28.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Of course, in other embodiments, no diluent bypasses the fractionation system 30, or in other words, there is no direct recycle of diluent to the reactors. Moreover, although not illustrated, polymer granules intermediate in the recovery system 24 and typically containing active residual catalyst may be returned to the reactor system 20 for further polymerization, such as in a different type of reactor or under different reaction conditions.

The polyolefin fluff 28 discharging from the diluent/monomer recovery system 24 may be extruded into polyolefin pellets 38 in an extrusion system 36. In the extrusion system 36, the fluff 28 is typically extruded to produce polymer pellets 38 with the desired mechanical, physical, and melt characteristics. An extruder/pelletizer receives the extruder feed including one or more fluff products 28 and whatever additives have been added. Extruder feed may include additives added to the fluff products 28 to impart desired characteristics to the extruded polymer pellets 38. The extruder/pelletizer heats and melts the extruder feed which then may be extruded (e.g., via a twin screw extruder) through a pelletizer die under pressure to form polyolefin pellets 38. Such pellets are typically cooled in a water system disposed at or near the discharge of the pelletizer.

A loadout system 39 may prepare the polyolefin pellets 38 for shipment in to customers 40. In general, the polyolefin pellets 38 may be transported from the extrusion system 36 to a product loadout area 39 where the pellets 38 may be stored, blended with other pellets, and/or loaded into railcars, trucks, bags, and so forth, for distribution to customers 40. Polyolefin pellets 38 shipped to customers 40 may include low density polyethylene (LDPE), linear low density polyethylene (LLDPE), medium density polyethylene (MDPE), high density polyethylene (HDPE), enhanced polyethylene, isotactic polypropylene (iPP), syndiotactic polypropylene (sPP), including various copolymers, and so on. The polymerization and diluent recovery portions of the polyolefin production system 10 may be called the "wet" end 42 or alternatively "reaction" side of the process 10. The extrusion 36 and loadout 39 systems of the polyolefin production system 10 may be called the "dry" end 44 or alternatively "finishing" side of the polyolefin process 10. Moreover, while the polyolefin pellets 38 discharging from the extrusion system 36 may be stored and blended in the loadout area 39, the polyolefin pellets 38 are generally not altered by the loadout system 39 prior to being sent to the customer 40.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Process variables in the polyolefin production system 10 may be controlled automatically and/or manually via valve configurations, control systems, and so on. In general, a control system, such as a processor-based system, may facilitate management of a range of operations in the polyolefin production system 10, such as those represented in FIG. 1. Polyolefin manufacturing facilities may include a central control room or location, as well as a central control system, such as a distributed control system (DCS) and/or programmable logic controller (PLC). The reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC). Moreover, in the controls systems, computer-readable media may store control executable code to be executed by associated processors including central processing units, and the like. Such code executable by the processor may include logic to facilitate the operations described herein.

The DCS and associated control system(s) in the polyolefin production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene or polypropylene, is discussed in the present context though it is to be understood that the present techniques may be similarly applicable to other types of liquid phase reactors.

Figure 2:
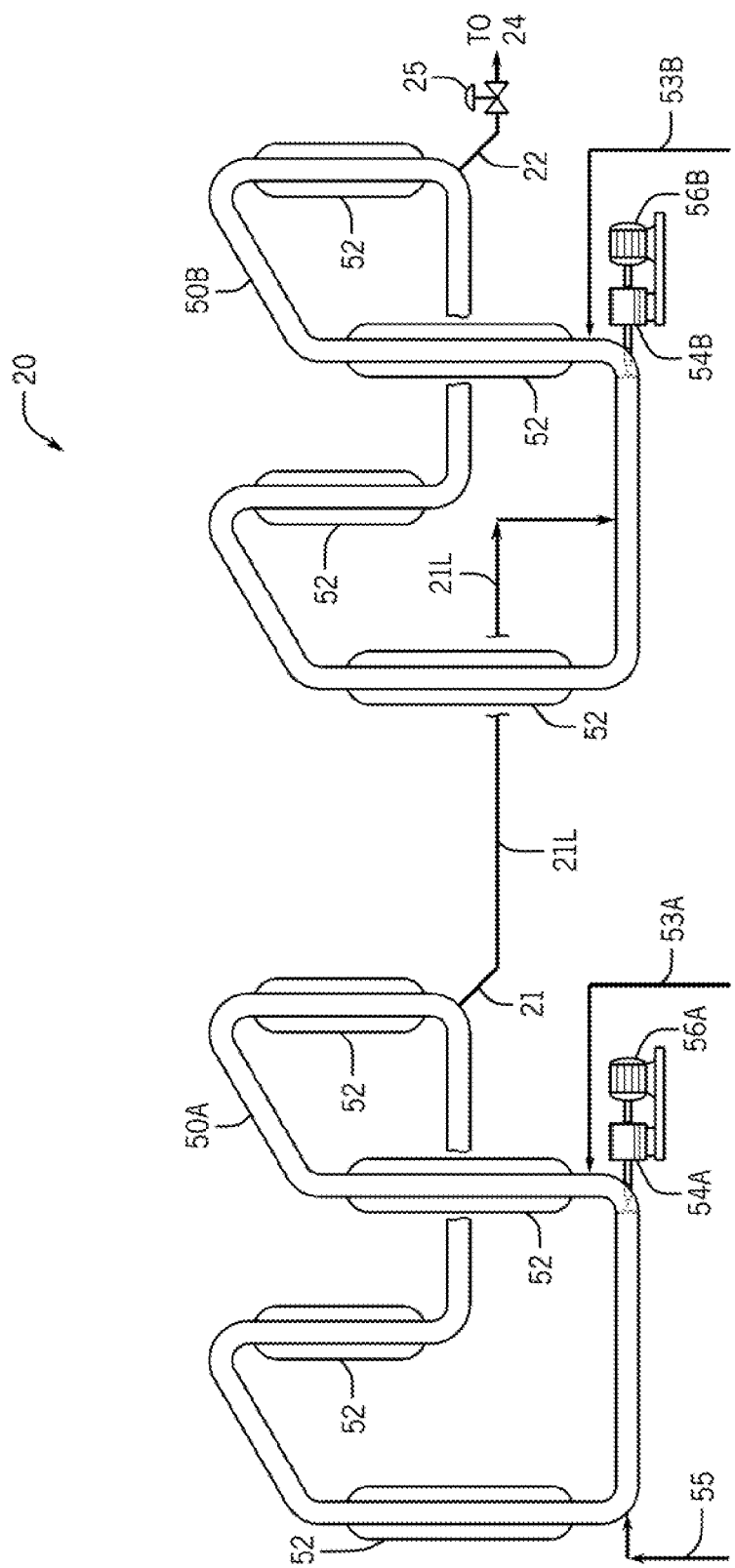
FIG. 2 is a process flow diagram of an exemplary reactor system of the polyolefin production system of FIG. 1 and not having a CTO on the first reactor discharge in accordance with embodiments of the present techniques.

FIG. 2 depicts an exemplary polymerization reactor system 20 (of FIG. 1) as having two loop slurry (polymerization) reactors 50A, 50B disposed and operated in series. Additional loop reactors or other reactors (e.g., gas phase reactors) may be disposed in series or parallel in the illustrated combination. Moreover, in embodiments, the reactors 50A, 50B may be shifted to a parallel operation, and/or processing equipment may be disposed between the two loop reactors 50A, 50B, and so on. The present techniques contemplate aspects of a variety of reactor system configurations such as those also disclosed in U.S. Patent Application Publication No. 2011/0288247 which is incorporated by reference herein in its entirety. The processing equipment disposed between the reactors 50A, 50B, if so disposed, may remove diluent, solids, light components, hydrogen, and so forth, from the transfer slurry 21 for recycle to the first reactor 50A and/or to a recovery system, and the like.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs (see, e.g., FIG. 4) approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium or coolants, such as treated water, through the reactor jackets 52. See Section III below for a discussion of the cooling system and reactor temperature control.

The reactors 50A, 50B may be used to carry out polyolefin (e.g., polyethylene, polypropylene) polymerization under slurry conditions in which insoluble particles of polyolefin are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50A, 50B may include olefin monomers and comonomers, diluent, co-catalysts (e.g., alkyls, triethylboron, TiBAL, TEAl, methyl aluminoxane or MAO, borates, TEB, etc.), activator supports like solid super acids, molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, n-heptane, cyclohexane, cyclopentane, methylcyclopentane, ethylcyclohexane, and the like. These components are added to the reactor interior via inlets or conduits at specified locations, such as depicted at feed streams 53A, 53B, which generally corresponds to one of the feed streams 18 of FIG. 1.

Likewise, a catalyst, such as those previously discussed, may be added to the reactor 50A via a conduit at a suitable location, such as depicted at feed stream 55, which may include a diluent carrier and which also generally corresponds to one of the feed streams 18 of FIG. 1. Again, the conduits that feed the various components tie-in (i.e., flange or weld) to the reactor 50. In the illustrated embodiment, catalyst feed 55 is added to the first reactor 50A in series but not to the second reactor 50B. However, active catalyst may discharge in a fluff slurry 21 from the first reactor 50A to the second reactor 50B. Moreover, while not depicted, a fresh catalyst may be added to the second reactor 50B in certain embodiments. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B are regulated to facilitate the desired properties and production rate of the polyolefin in the reactor, to control stability of the reactor, and the like. Temperature is typically maintained below that level at which the polymer product would significantly go into solution, swell, soften, or become sticky. As indicated, due to the exothermic nature of the polymerization reaction, a cooling fluid or coolant may be circulated through jackets 52 around portions of the loop slurry reactor 50A, 50B (see Section III below) to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450 to 700 psig being typical. Of course, the reactor cooling and temperature control techniques disclosed herein may be applicable to lower-pressure polyolefin processes, such as those with reactors operating in a typical range of 50 psig to 100 psig, and with hexane as a common diluent, for example.

As the polymerization reaction proceeds within each reactor 50A, 50B, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 500A, 50B via a reactor discharge. In the illustrated embodiment of FIG. 2, a transfer slurry 21 is discharge from the first reactor 50B, and a product slurry 22 is discharged from the second reactor 50B.

For the transfer slurry 21 and product slurry 22, the reactor discharge may be (1) an intermittent discharge such as a settling leg, pulsating on/off valve, and so on, or (2) a continuous discharge such as continuous take-off (CTO) which has a modulating valve, and so forth. As for a continuous discharge of the transfer slurry 21 from the first reactor 50A, a continuous discharge on the first reactor may be a CTO, or may be a continuous discharge without a modulating valve (but with an isolation valve, for example), and so on. The pressure differential between the discharge of the first loop reactor pump 54A and the suction of the second loop reactor pump 54B may provide a motive force for the transfer of transfer slurry 21 from the first loop reactor 500A to the second loop reactor 50B. Moreover, the pump suction, whether of the first pump 54A or second pump 54B, may be considered upstream of the pump in pipe length of the respective loop in the range of about 0.5 meter to 50 meters (e.g., 0.5, 1, 5, 15, 25, 50 meters, or values in between).

Again, in certain examples, the two loop reactors 50A, 50B may be operated in series and such that the polyolefin fluff in the fluff slurry 22 discharging from the second reactor 50B is monomodal or bimodal. In certain cases of monomodal production, the reactor operating conditions may be set such that essentially the same polyolefin or similar polyolefin is polymerized in each reactor 50A, 50B. On the other hand, in monomodal production in terms of molecular weight, the conditions in the reactor may be the same or similar such as with regard to hydrogen concentration but different in terms of comonomer concentration, for example, so to produce polyolefin with similar molecular weight but different polymer density in each reactor.

In the case of bimodal production, the reactor operating conditions may be set such that the polyolefin polymerized in the first reactor 50A is different than the polyolefin polymerized in the second reactor 50B. Thus, with two reactors, a first polyolefin produced in the first loop reactor 50A and the second polyolefin produced in the second loop reactor 50B may combine to give a bimodal polyolefin or a monomodal polyolefin. Further, again, whether monomodal or bimodal. i.e. in terms of molecular weight, the first polyolefin produced in the first loop reactor 50A and the second polyolefin produced in the second loop reactor 50A may have different polymer densities, for example.

Operation of the two loop reactors 50A, 50B may include feeding more comonomer to the first polymerization reactor than to the second polymerization rector, or vice versa. The operation may also include feeding more chain transfer agent (e.g., hydrogen) to the second polymerization reactor than the second reactor, or vice versa. Of course, the same amount of comonomer and/or the same amount of chain transfer agent (e.g., hydrogen) may be fed to each reactor 50A, 50B. Further, the same or different comonomer concentration may be maintained in each reactor 50. Likewise, the same or different chain transfer agent (e.g., hydrogen) concentration may be maintained in each reactor 50A, 50B.

Furthermore, the first polyolefin (i.e., polyolefin polymerized in the first reactor 50A) may have a first range for a physical property, and the second polyolefin (i.e., polyolefin polymerized in the second reactor 50B) may have a second range for the physical property. The first range and the second range may be the same or different. Exemplary physical properties may include polyolefin density, comonomer percentage, short chain branching amount, molecular weight, viscosity, melt index, melt flow rate, crystallinity, and the like.

As indicated, the polyolefin product fluff slurry 22 discharges from the second reactor 50B and is subjected to downstream processing, such as in a diluent/monomer recovery system 24. The product fluff slurry 22 may discharge through a settling leg, a continuous take-off (CTO), or other valve configurations. The product fluff slurry 22 may discharge intermittently such as through a settling leg configuration or pulsating on/off valve, or instead may discharge continuously such as through a CTO.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25. A Ram valve in a closed position may beneficially provide a surface that is flush with the inner wall of the reactor to preclude the presence of a cavity, space, or void for polymer to collect when the Ram valve is in the closed position. Exemplary CTO configurations and control, and other discharge configurations, may be found in the aforementioned U.S. Patent Application Publication No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

In the embodiment of FIG. 2, a transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off (which as indicated the CTO has an isolation or Ram valve and a modulating valve), or other valve configuration.

As indicated, a variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO is further defined as a continuous discharge having an isolation valve (e.g., Ram valve) at the reactor wall and a modulating valve (e.g., v-ball valve) on the discharge conduit at the reactor.

In the illustrated embodiment, the discharge of the transfer slurry 21 from the first loop reactor 50A is continuous and not directly modulated. A CTO or settling leg is not employed. Instead, the transfer slurry 21 discharges through an isolation valve (e.g., Ram valve) (not shown) on the transfer line 21L at the reactor wall and without a modulating valve in this example. In a particular example, the transfer slurry 21 discharges through a full-bore Ram valve maintained in a full-open position, and not additionally through a modulating valve. In alternate embodiments (not illustrated, a modulating valve may be disposed downstream on the transfer line 21, or a CTO with its modulating valve may be situated at the transfer slurry 21 discharge of the first reactor 50A. If so included, the modulating valve may control flow rate of the transfer slurry 21 and facilitate control of pressure in the first loop reactor 50A. Moreover, a modulating valve or a CTO and its modulating valve may be disposed to facilitate control of the first reactor 50A discharge when the two reactors 50A and 50B are shifted in operation to parallel performance, for instance.

Nevertheless, in the various embodiments, an isolation (e.g., Ram) valve is typically disposed on the discharge at the wall of the first loop reactor 50A. The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate discharge or transfer line from the first reactor 500A is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

In the illustrated embodiment, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 500B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. The various instruments may have local indication of the sense variable. For instance, a pressure element or instrument may be or have a local pressure gauge and a temperature element or instrument may be or have a local temperature gauge, both of which may be read locally by an operator or engineer, for example.

Figure 2A:
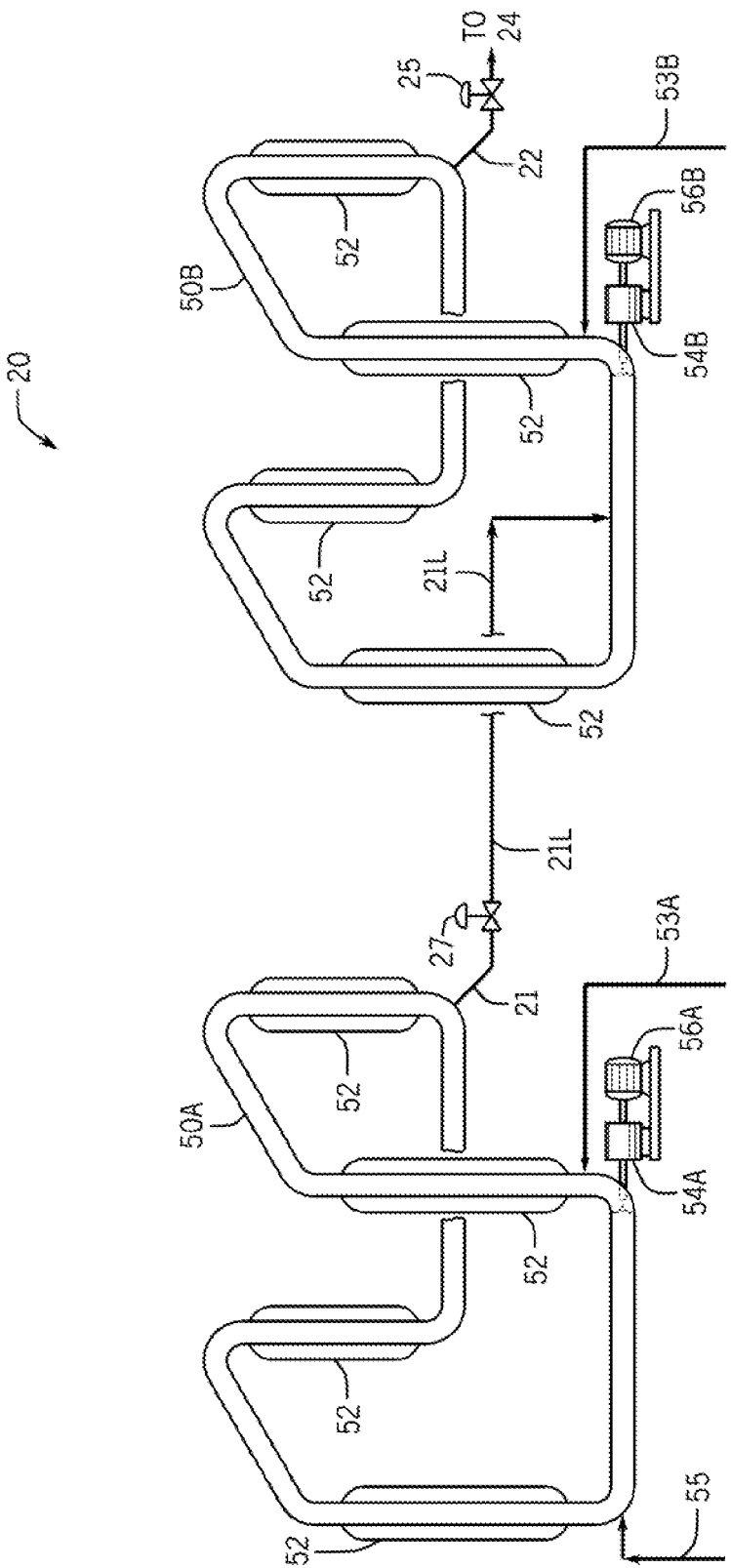
FIG. 2A is a process flow diagram of an exemplary reactor system of the polyolefin production system of FIG. 1 and having a CTO on the first reactor discharge in accordance with embodiments of the present techniques.

The inlet position of the transfer line 21L may couple to the first loop reactor 50A on the discharge side of the circulation pump 56A in the first loop reactor 50A. The outlet position of the transfer line 21L may couple to the second loop reactor on the suction side of the circulation pump 56B in the second loop reactor 50B. Such a configuration may provide a positive pressure differential (i.e., a driving force) for flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi). Again, that pump suction, whether of the first pump 54A or second pump 54B, may be considered upstream of the pump in linear loop pipe length in the range of about 0.5 meter to 50 meters (e.g., 0.5, 1, 5, 15, 25, 50 meters, or values therebetween). FIG. 2A depicts an exemplary polymerization reactor system 20 in which unlike FIG. 2, the first reactor 50A has a CTO discharge having a modulating valve 27 for the transfer slurry 21 discharge.

III. Cooling System for Reactor Temperature Control

Figure 3:
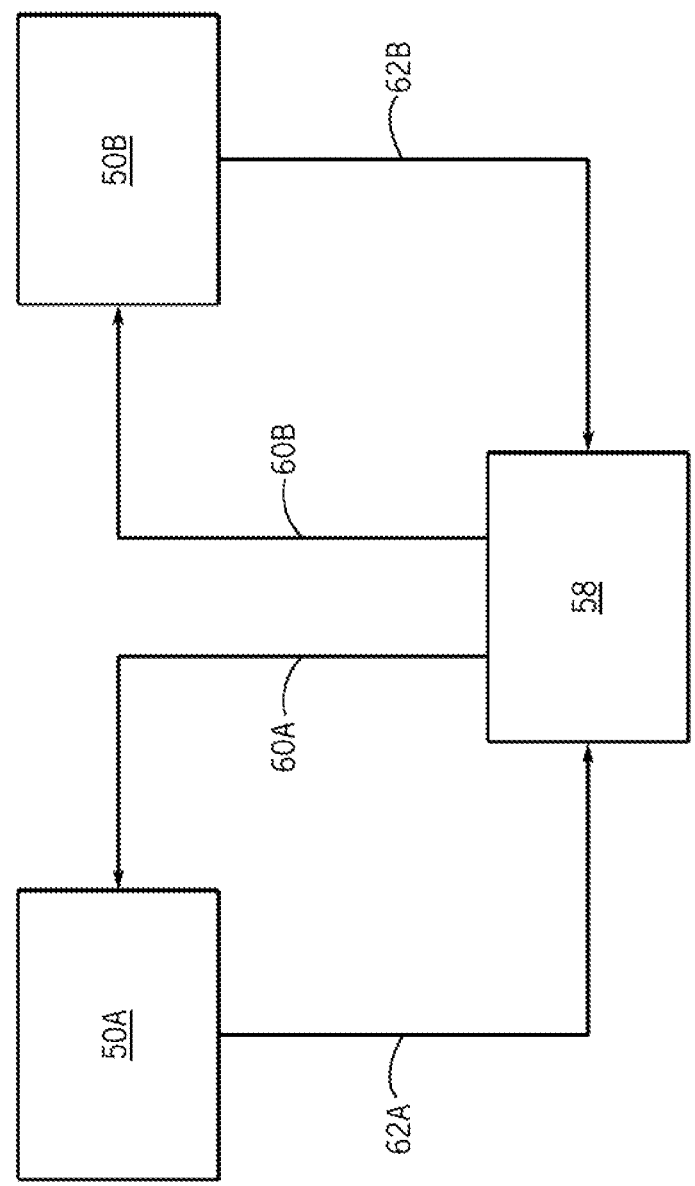
FIG. 3 is a diagrammatical representation of the exemplary reactor systems (of FIGS. 1-2A) having a cooling (coolant) system in accordance with embodiments of the present techniques.

Turning now to FIG. 3, an exemplary reactor system 20 of FIGS. 1 and 2 is depicted having two polymerization reactors 50A and 50B, and a shared or common cooling system 58. As shown in FIG. 3 and discussed in more detail below with respect to subsequent figures, the coolant or cooling system 58 provides a coolant supply 60A to reactor 50A, and a coolant supply 60B to reactor 50B. The cooling system 58 receives a coolant return 62A from reactor 50A, and a coolant return 62B from reactor 50B. The coolant removes heat from the reactors and, therefore, the coolant return is generally greater in temperature than the coolant supply. The cooling system 58 processes the coolant return 62A and 62B to provide the cooled coolant supply 60A and 60B to the reactors.

In general, the cooling system 58 removes heat from polymerization reactors, such as loop reactors and other polymerization reactor types having a reactor jacket or other coolant flow path. The coolant is a cooling medium such as treated water. The cooling system 58 discharges a coolant supply to the reactor, i.e., to the reactor heat-transfer jackets, and receives a coolant return from the reactor, i.e., from the reactor heat-transfer jackets.

Figure 4:
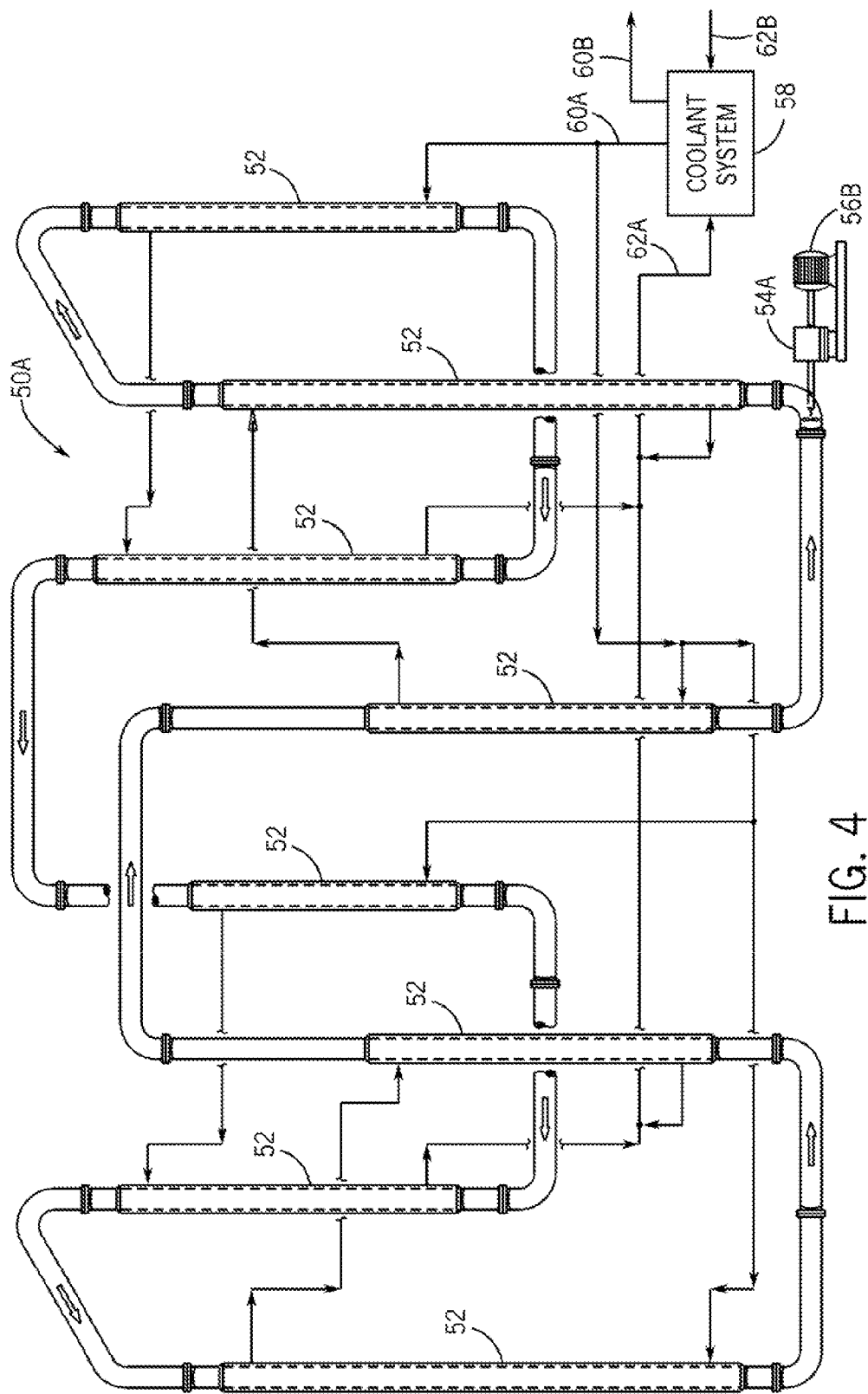
FIG. 4 is a schematic of a reactor of the reactor systems (of FIGS. 1-2A) having reactor jackets and employing an exemplary cooling (coolant) system in accordance with embodiments of the present techniques.

FIG. 4 is the first loop reactor 50A (having eight legs in this example). In the illustrated embodiment of FIG. 4, the cooling system 58 discharges a coolant supply 60A to the first loop reactor 50A, and a coolant supply 60B to the second loop reactor 50B (not shown). The cooling system 58 receives and processes a coolant return 62A from the first loop reactor 50A, and a coolant return 62B from the second loop reactor 50B. The coolant flowing in the reactor jackets 52 absorbs heat from the reactor contents through the reactor wall. The cooling system 58 may also be configured to remove heat from additional polymerization (e.g., loop) reactors in addition to loop reactors 50A and 50B.

For the sake of clarity, FIG. 4 depicts the first loop reactor 50A but not the second loop reactor 50B or additional reactors. However, the second loop reactor 50B (and additional reactors) may be similar or substantially identical in configuration as reactor 50A with respect to the cooling system 58. Therefore, while the discussion at times may focus on the first loop reactor 50A, the discussion may equally apply to the second loop reactor 50B and to additional polymerization or loop reactors that employ the cooling system 58.

The illustrated embodiment of FIG. 4 depicts a countercurrent flow scheme of coolant through the reactor jackets 52. In embodiments, the cooling system 58 removes heat from the loop reactor 50A via the reactor jackets 52. An example configuration of the reactor jackets 52 for a given reactor is two counter-current double-pipe exchangers operated in parallel, with the inner pipe (the reactor) having an approximate 22 inch internal diameter, and the outer pipe (the jacket) having an approximate 28 inch internal diameter. In this example, the total heat transfer area of the reactor jackets 52 for one loop reactor is about 5,000 square feet for a 4-leg reactor and 10,000 square feet for a 8-leg reactor, for instance. Of course, other jacket configurations, sizes, and heat transfer areas can be accommodated with the present techniques.

As discussed above, the loop reactor 50A as shown in FIG. 4 may be used to carry out polyolefin polymerization under slurry conditions in which insoluble particles of polyolefin are formed in a fluid medium and are suspended as slurry until removed. The loop reactor 50A is generally composed of segments of pipe connected by smooth bends or elbows. A motive device, such as pump 54A, circulates the fluid slurry in the reactor 50A. An example of a pump 54A is an in-line axial flow pump with the pump impeller disposed within the interior of the reactor 50A. The impeller propels the reactor slurry through the closed loop of the reactor, as depicted by arrows, at sufficient speed to keep solid particulates, such as catalyst and polyolefin product, suspended within the fluid medium of the slurry.

As the polymerization reaction proceeds within the reactor 50A, the reaction conditions may be controlled to facilitate the desired degree of polymerization and reaction speed while keeping the temperature below that at which the polymer product would go into solution. As mentioned, due to the exothermic nature of the polymerization reaction, the cooling jackets 52 are provided (around portions of the closed loop system) through which the coolant or cooling fluid is circulated as needed to remove excess heat (heat of reaction) from the reactor, thereby maintaining the reactor temperature within the desired range, generally between 150° F. to 250° F. (65° C. to 121° C.), for example. Moreover, it may be desired to maintain the temperature set point, for example, within +/−0.25° F.

In general, reactor temperature varies directly or linearly with changes in the reactor system operating conditions. In certain examples, the heat generated in the reactor by the exothermic polymerization is generally linear with the polyolefin production rate (i.e., pounds per hour of polyolefin polymerized). Thus, reactor temperature, which is an indication of the energy or heat in the reactor, may vary generally linearly with production rate. Therefore, typical reactor temperature control may involve a proportional-integral-derivative (PID) algorithm.

Figure 5:
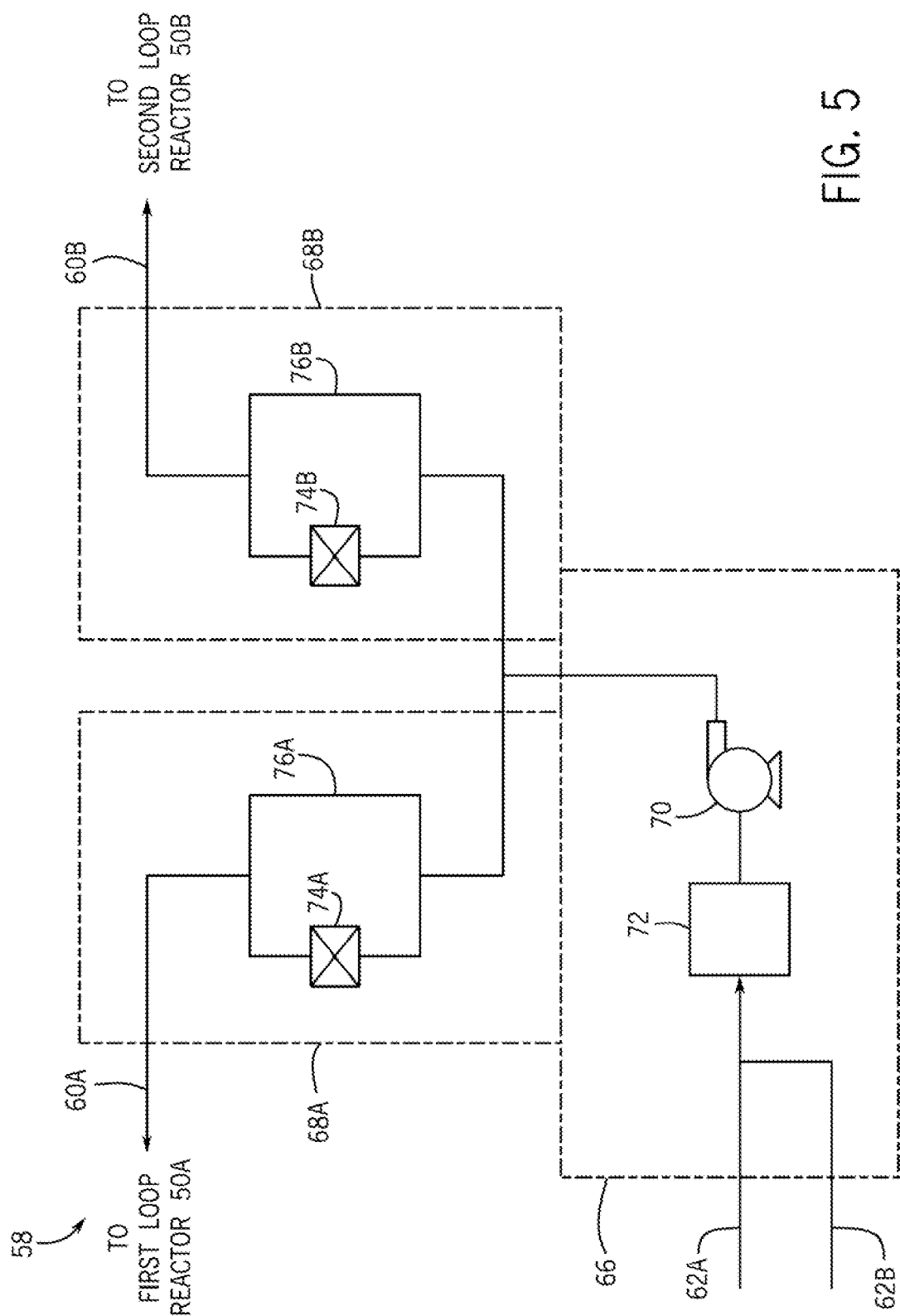
FIG. 5 is a diagrammatical representation of the exemplary cooling system (of FIG. 4) supplying multiple reactors in accordance with embodiments of the present techniques.

FIG. 5 is an exemplary cooling system 58 of FIGS. 3 and 4. In this example of FIG. 5, the cooling system 58 has a common or shared section 66, and individual sections 68A and 68B for the loop reactors 50A and 50B, respectively. As discussed, the cooling system 58 provides respective coolant supply 60A and 60B to the loop reactors 50A and 50B, and receives and cools coolant return 62A and 62B from the loop reactors 50A and 50B.

The shared section 66 uniquely provides a common pump 70 that may be sized according to the number of reactors supplied with coolant, which in the illustrated case is two loop reactors 50A and 50B. The employment of common pump 70, as opposed to multiple pumps dedicated to each reactor, respectively, beneficially reduces capital and operating costs. The shared section 66 may also include a surge tank 72.

The individual sections 68A and 68B of the cooling system 58 beneficially provide separate coolant flow and separate temperature control for the reactors 50A and 50B. The temperature control for each reactor 50A and 50B may therefore before be improved as compared to a common or cascaded supply of coolant flow to the reactors and a shared temperature control scheme. Advantageously, the reactor temperature set point of the reactors 50A and 50B may be maintained within +/−0.25° C. in certain examples with the present techniques. Other tolerances for the reactor temperature set point may be maintained, such as +/−0.2° C., +/−0.3° C., +/−0.4° C., +/−0.5° C., +/−1.0° C., and so on, including values therebetween.

Each individual section 68A and 68B includes a heat exchanger or cooler 74A and 74B to remove heat from the coolant. In the illustrated embodiment of FIG. 5, a bypass line 76A and 76B is disposed around each cooler 74A and 74B. Therefore, as discussed in more detail below, the amount of coolant subjected to the cooler 74A and 74B may be varied but with the respective coolant flow rate to each reactor beneficially maintained relatively constant for hydraulic and heat transfer stability.

A variety of coolants may be used to remove or add heat to the reactor system. In certain embodiments, steam condensate (demineralized water) is used as the coolant. The coolant return 62A and 62B "carries" the heat removed from the respective reactors 50A and 50B. The cooling system 58 transfers this heat to a utility cooling medium (e.g., cooling tower water or sea water) of the coolers 74A and 74B within each individual section 68A and 68B. Thus, the cooling system delivers "cooled" coolant supply 60A and 60B to the reactor jackets. Typical coolant supply 60A and 60B temperatures may range from 105° F. to 150° F., and typical coolant return 62A and 62B temperatures may range from 130° F. to 190° F.

Lastly, respective heaters (not shown) may also be included in the individual sections 68A and 68B to provide for heating of the coolant, such as during start-up of a loop reactor 50A and 50B. The heaters may be installed on the various conduits in the individual sections 68A and 68B including on a dedicated parallel conduit (see, e.g., FIG. 7). The heater may be employed, for example, to heat the coolant to facilitate initiation of the polymerization reaction during start-up of the loop reactors 50A and 50B. The heater may be turned off during normal operation of the loop reactor.

Figure 6:
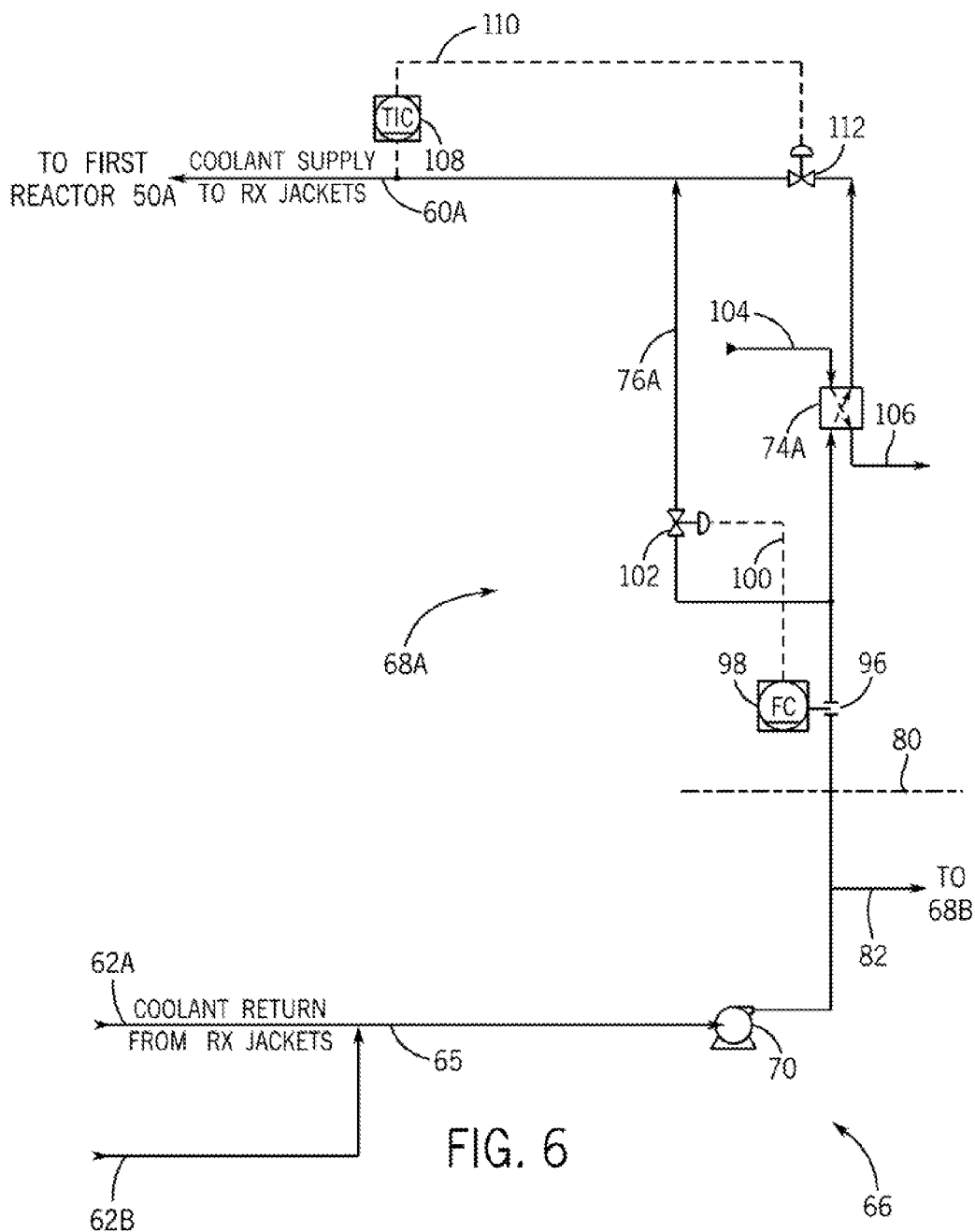
FIG. 6 is a process diagram of a portion of the exemplary cooling system of FIGS. 4-5 in accordance with embodiments of the present techniques.
Figure 7:
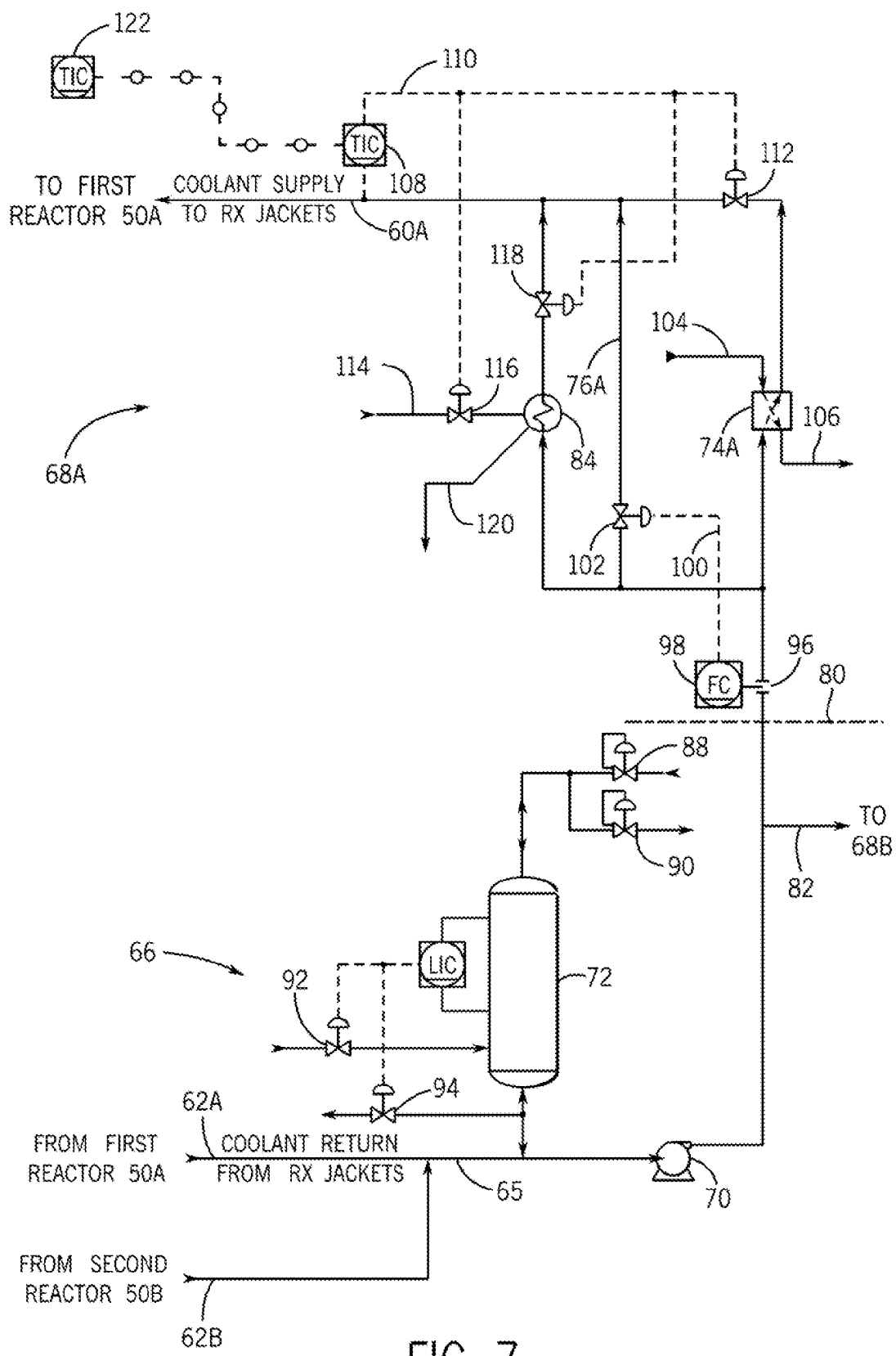
FIG. 7 is another process diagram of the portion of the exemplary cooling system shown in FIG. 6 in accordance with embodiments of the present techniques.

Referring to FIGS. 6 and 7, two examples of a portion of the cooling system 58 of FIGS. 3-5 are shown, respectively. The common section 66 services both loop reactors 50A and 50B. The individual section 68A for the first loop reactor 50A is depicted. The interface between the common section 66 and the individual section 68A is indicated by the dotted line 80 (the beginning of the individual section 68A).

For the sake of clarity, the other individual section 68B for the second loop reactor 50B is not shown. However, in these examples, the individual section 68B is substantially similar or identical to the individual section 68A. Therefore, while the discussion with respect to FIGS. 6 and 7 may focus at times on the individual section 68A and the first reactor 50A, it should be appreciated that the discussion can equally apply to the individual section 68B and the second reactor 50B.

FIG. 6 is a generally more simplified depiction showing the shared pump 70 in the common section 66, and the cooler 74A and bypass line 76A in the individual section 68A. The temperature of the coolant supply 60A to the first loop reactor 50A is controlled by modulating the amount of coolant flowing through the cooler 74A. In both FIGS. 6 and 7, the flow rate of the coolant supply 60A to the first loop reactor 50A may be maintained substantially constant by modulating the amount of coolant flowing through the bypass line 76A.

FIG. 7 additionally shows a surge drum 72 in the common section 66, and a heater 84 in the individual section 68A, both of which are discussed in more detail below. In certain embodiments, the temperature of the coolant supply 60A to the first loop reactor 50A is controlled by modulating the amount of coolant flowing through the cooler 74A and through the heater 84 (whether or not the heater is supplying heat). When the heater 84 is "off" and not providing heat, the heater 84 may be merely a "wide spot" in what can be characterized as a second bypass line around the cooler 74A. In certain embodiments, this second bypass line (i.e., through the heater 84) may be employed as the primary bypass line (see FIG. 7) for diverting coolant flow from the cooler 74A to adjust coolant temperature, and the first bypass line 76A employed to help maintain a substantially constant total flow of coolant supply 60A to the reactor 50A. Of course, with regard to FIGS. 6 and 7, other variations of the controllers and control valves are contemplated to provide temperature and flow control.

Continuing with FIGS. 6 and 7, the common section 66 discharges coolant to the individual section 68A which discharges coolant supply 60A to the reactor jackets 52 of the first reactor 50A. Likewise, the common section 66 discharges coolant, as indicated by reference numeral 82, to the individual section 68B which discharges coolant supply 60B (not shown) to the reactor jackets 52 of the second reactor 50B. In these examples, the common section 66 receives the coolant return 62A from the first loop reactor 50A, and the coolant return 62B from the second loop reactor 50B. As illustrated, the individual section 68A cools (i.e., removes heat from) the coolant via cooler 74A (see also FIG. 5), and provides the coolant supply 60A to the first loop reactor 50A.

The coolant flow through the cooling system 58 and through the reactor jackets 52 of both loop reactors 50A and 50B may be circulated, for example, by a centrifugal pump, as illustrated by coolant pump 70 (see also FIG. 5). An exemplary design basis of a coolant pump is approximately 50 to 60 pounds per square inch (psi) delivered head at 12 to 24 million pounds per hour of coolant (i.e., 6 to 12 million pounds per hour of coolant per reactor).

The coolant circulation may be a closed loop, hydraulically full system. Thus, a surge drum 72 (not show in FIG. 6 but discussed below with respect to FIG. 7) may be employed in the coolant circuit (i.e., at or near the suction of pump 70) to maintain the circuit liquid full and to reduce swings in pressure of the coolant system by compensating for hydraulic expansion caused by coolant temperature swings. Thus, pressure may be maintained substantially constant at the pump 70 suction by controlling level and pressure of the surge drum 72.

As indicated, the flow rate of coolant through the cooler 74A and 74B and the flow rate of coolant through bypass line 76A and 76B may be varied to facilitate coolant 60A and 60B temperature control and reactor 50A and 50B temperature control. Yet, the circulation flow rate of coolant 60A and 60B through the reactor jackets of the reactor 50A and 50B is generally maintained substantially constant. Thus, the total circulation flow rate of coolant 65 through the coolant system 58 and all reactor jackets is typically maintained constant. However, the total flow rate of coolant 65 and also the flow rate of coolant 60A and 60B to each reactor 50A and 50B may be adjusted if desired. Further, it should be noted that the respective flow rate of coolant 60A and 60B to each reactor 50A and 50B may be the same or different. The coolant 60A and 60B flow rate through the jackets for each reactor 50A and 50B may be measured via a flow element in the respective individual sections 68A and 68B, for instance.

In the illustrated embodiments of FIGS. 6 and 7, the circulation flow rate through the reactor jackets of the first loop reactor 50A is measured at flow element 96. The flow element 96 may represent, for example, a flow orifice plate installed in the coolant piping with pressure detection taps disposed on the piping upstream and downstream of the orifice. A control system distributed control system (DCS) may calculate the circulation flow rate through the first reactor jackets based on the orifice size and the measured upstream and downstream pressures. The flow rate indication from flow element 96 is received by flow controller 98, which may be a control block in the DCS. To maintain substantially constant flow through the reactor jackets of the first loop reactor 50A, the output of flow controller 98, using control signal 100, may adjust the position of the valve 102 on the flow bypass line 76A (see also FIG. 5). In one embodiment, it is desirable to minimize movement of valve 102 position to prevent cycling in the coolant pump 70. Thus, additional means at other points in the system may assist in maintaining the total coolant circulation flow rate constant. Moreover, in all, DCS such as that manufactured by Honeywell, Foxboro, Fisher, and so on, may facilitate the control scheme in each individual section 66A and 66B.

During normal operation of the loop slurry reactor 50A, heat is removed from the reactor contents, and heat is exchanged in cooler 74A (see also FIG. 5), which may represent one or more coolers. Heat is removed from the coolant in cooler 74A to cool the coolant supply 60 to the reactor jackets 52 of the first loop reactor 50A. The cooler 74A may be, for example, a shell and tube heat exchanger or a plate and frame heat exchanger. A utility cooling medium, such as cooling tower water or sea water, flows through the cooler opposite the coolant, removing heat through the heat transfer surface area if the cooler 74A but not commingling with the coolant. The utility cooling medium flow is represented in these examples of FIGS. 6 and 7 by cooling water supply 104 and cooling water return 106.

A cooling tower (not shown), for example, may process the circulating utility cooling medium by removing heat from the cooling water return 106 and providing cooled cooling water supply 104. Thus, in this embodiment, the cooling tower water removes heat from the coolant, which in turn removes heat from the reactor 50A.

In one example, the cooler 74A represents four plate and frame exchanger coolers that operate in parallel, each cooler having approximately 200 stainless steel (SS-304) plates and approximately 1600 square feet of heat transfer surface, with the heat transfer coefficient varying from about 200 to over 800 Btu/hr/sq. ft/° F. as a function of coolant flow rate. In certain embodiments, the heat removed is about 15.5 million Btu/hr removed per each of the four coolers comprising cooler 74A, and with a design pressure drop of approximately 3 psi on the coolant side. For the temperature control, coolant controller 108 (coolant temperature controller) maintains the temperature of the coolant 50A supply to the reactor jacket. Coolant controller 108 sends an output signal 110 to adjust the positions of valve 112 (and potentially other valves).

As mentioned, the total coolant circulation may be a closed loop, hydraulically full system. Thus, a surge drum 86 (FIG. 7) may be employed in the coolant circuit (i.e., at or near the suction of the pump 84) to maintain the circuit liquid full and to reduce swings in pressure of the coolant system by compensating for hydraulic expansion caused by coolant temperature swings. Thus, pressure may be maintained substantially constant at the pump 84 suction by controlling level and pressure of the surge drum 86.

In the particular example of FIG. 7, a constant pressure gas pad may be maintained in the overhead of surge drum 72 to maintain a constant pump 70 suction pressure. For example, a pressure regulator 88 may add nitrogen to the surge drum 72 overhead and pressure regulator 90 may remove gas from the overhead. Any suitable gas, such as nitrogen, may be used for the gas pad on the surge drum 72 overhead. The pressure regulators 88 and 90 may be local control valves. A substantially constant liquid level may be maintained in surge drum 72 by adding and draining coolant via level control valves 92 and 94, respectively. Recovery of the coolant (e.g., steam-condensate, demineralized water, treated water, etc.) removed from the system via level control valve 94 may normally not be required.

Again, during normal operation of a polyolefin loop slurry reactor 50A and 50B, heat is removed from the reactor contents. During start-up of the reactor, however, heat is added to the reactor contents to facilitate initiation of the polymerization. The cooling system 58 may be used to add heat to the reactor 50A and 50B contents until the polymerization becomes exothermic.

Therefore, the cooling system may include a heater 84 (FIG. 7), which may represent one or more heaters. Steam 114, or some other heating medium, flows through steam supply valve 116 to the utility side of heater 84 to heat the reactor coolant on the process side of heater 84. During startup of reactor 50A, relatively more reactor coolant flows through cooler bypass valve 118, which acts as a heater 84 valve. The cooler valve 112 is normally closed during startup of reactor 50A and opened after the polymerization reaction becomes exothermic to facilitate cooling rather than heating.

The heater 84 may be, for example, a shell and tube heat exchanger, a mixer, a sparger, or an eductor, such as a pick heater. If a shell and tube heat exchanger is used, the steam 114 is normally not mixed with the coolant but instead condensed and removed as steam condensate, for example, via a steam trap (not shown) disposed on discharge 120 from the utility side of the heat exchanger. The condensate may be recovered or sent to drain (sewer). For the case of the heater 84 representing an eductor, such as a pick heater, the steam 114 is mixed with the coolant to heat the coolant via direct steam injection and, thus, the discharge 120 is typically not used. In one configuration, a four inch steam sparger adds 300 psig steam directly into the coolant through an 18 inch piping elbow.

After startup of reactor 50A and when the reaction in reactor 50A becomes exothermic, the normal operation of the cooling system is to remove heat from reactor 14. Thus, steam supply valve 116 is closed and no steam 114 is added to heater 84. Coolant will continue to flow through cooler bypass valve 118 but is not heated. In certain examples, the valve 118 modulates coolant flow through this primary bypass to maintain a constant total coolant flow to the reactor jackets, and thus to stabilize flow through the secondary bypass 76A controlled by flow controller 98 and flow control valve 102. Other bypass configurations may be implemented.

It should be noted that in this example the steam supply valve 116, cooler bypass valve 118, and cooler valve 112 are temperature control valves. Indeed, in the example of FIG. 7, the output or control signal 110 may from the temperature controller 108 drives the respective valve position of each of these three valves, to give the desired temperature of the coolant supply 60A to the first loop reactor 50A, and thus ultimately the desired reactor temperature in the reactor 50A. As indicated, the valve 102 on the bypass 76A is a flow control valve which may be configured to facilitate a substantially constant flow rate of coolant discharging from the individual section 68A to give a substantially constant circulation rate of coolant through the reactor jackets of the first loop reactor 50A.

In sum, for certain embodiments during normal operation of the individual section 68A and during normal production of polyolefin in reactor 50A, steam supply valve 116 is closed. Cooler bypass valve 118 and cooler valve 112 are used to manipulate the flow to give the desired coolant supply temperature to the reactor jackets. For example, if a cooler coolant supply is desired, more coolant will flow through valve 112 to give more flow through the cooler 74A, and less coolant will flow through valve 118 to balance the total hydraulic flow, maintaining constant the total coolant flow rate to the reactor jackets 52 of the first reactor 50A (FIGS. 2-4). Flow controller 98 and flow control valve 102 represent additional means to maintain a constant total coolant flow to the reactor jackets. What is more, it should be noted that the placement of the coolant system control valves, such as cooler valve 112, may vary within the exemplary polyolefin reactor system 20 or other polyolefin production systems. For instance, the coolant valve, such as cooler valve 112, may more be disposed upstream of the cooler 74A instead of downstream as depicted in FIGS. 6 and 7.

Figure 8:
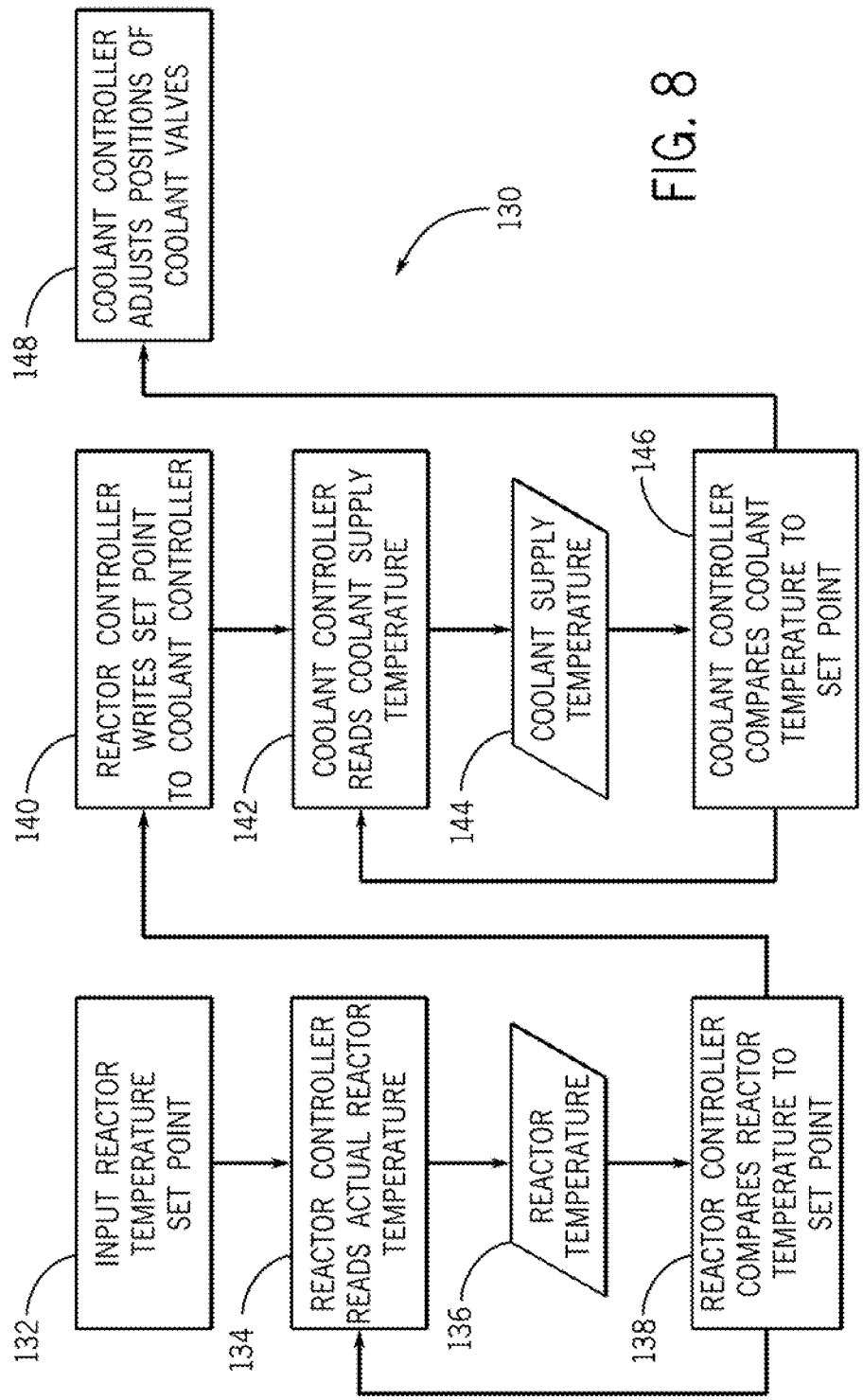
FIG. 8 is a block flow diagram of a method for an exemplary reactor temperature control scheme in accordance with embodiments of the present techniques.

As mentioned, the reactor temperature may generally vary linearly with changes in the reactor system operating conditions. Typical reactor temperature control may involve a proportional-integral-derivative (PID) algorithm because PID control is generally well-suited for controlling a linear process. An accepted assumption in the art is that heat generated in the reactor by the exothermic polymerization is linear with the polyolefin production rate (i.e., pounds per hour of polyolefin polymerized). Thus, reactor temperature, which is an indication of the energy or heat in the reactor, varies linearly with production rate. This linear assumption is only an approximation, however, and therefore, the reactor temperature control may also involve a cascade scheme (FIGS. 7 and 8). The inner or secondary loop of a cascade control scheme may correct for non-linear behavior in the reactor process. It should be noted, however, that the cooling system 58 and associated techniques discussed herein may be applicable to a variety of linear and non-linear heat-generation relationships.

Referring again to FIG. 7 for the temperature control, coolant controller 108 (coolant temperature controller) maintains or adjusts the temperature of the coolant supply discharging from the individual section 68A to the reactor jackets 52 of the first loop reactor 60A. Coolant controller 108 sends an output signal 110 to adjust the positions of valves 112 and 118 (and valve 116 during startup). Coolant controller 108 receives its set point from reactor controller 122, which controls the temperature of the reactor 50A. The temperature set point of reactor controller 112 may be entered by the human operator. Thus, in this example, reactor controller 122 is the primary controller and coolant controller 108 is the slave controller in a cascade control scheme.

FIG. 8 is a flow diagram of an exemplary temperature control scheme 130 of a reactor 50A or 50B. The controllers referenced in FIG. 8 may be the aforementioned coolant controller 108 and reactor controller 122 (FIG. 7). Reactor controller 122 maintains the polymerization temperature in the reactor 50A or 50B at the desired set point. In the example of FIG. 8, the operator inputs (block 132) the desired temperature set point of the reactor into the reactor controller 122. This desired polymerization temperature may be based on the type of polyolefin or the specific grade of polyolefin.

The reactor controller 122 reads (block 134) the actual reactor temperature 136 from a temperature indicator or sensor located on the reactor 50A or 50B. This temperature indication (i.e., measurement) may be accomplished, for example, by a temperature sensor or element, such as a thermocouple or resistance temperature device (RTD), inserted into a thermowell that extends into the reactor contents. The reactor temperature 136 (polymerization temperature) measured by this temperature element may be sent via an electronic signal, for example, to a distributed control system (DCS), a programmable logic (PLC) based system, or some other means of controlling the cooling/coolant system. The reactor controller 122 may be defined within the process control system, such as the DCS or PLC-based system, and configured to read the reactor temperature 136.

The reactor controller 122 compares (block 138) the actual reactor temperature 136 versus the set point entered by the operator. The error or difference between the set point and measured value drives the controller 122 action (output). The tuning parameters of the reactor controller 122 decide this action. The reactor controller 122 may write a coolant temperature set point (block 140) to coolant controller 108 (FIG. 7) to ultimately help maintain the reactor temperature 136 at its set point. As mentioned, a typical desired tolerance in a polyolefin (e.g., polyethylene) slurry reactor technology is to control the actual reactor temperature 136 at set point plus or minus 0.25° F. In certain embodiments, the cascade nature of the overall control scheme is reflected by the fact that the reactor controller 122 output supplies the coolant temperature set point to the coolant controller 108.

The coolant controller 108 maintains the coolant supply temperature at the desired coolant temperature set point. The coolant controller 108 reads (block 142) the temperature 144 of the reactor coolant supply 60A or 60B (FIGS. 3-5). The coolant controller 108 compares (block 146) the actual coolant supply temperature 60A or 60B versus the coolant supply temperature set point supplied by the reactor controller 122. Based on the difference or error between the measured coolant temperature 144 and the set point generated by the reactor controller 122, the coolant controller 108 may send an output signal 110 to adjust (block 144) the valve opening positions of the cooler valve 60 and cooler bypass valve 58. The coolant controller 66 may also send an output signal 110 to adjust (block 144) the position of steam supply valve 116 (FIG. 7), for example, during start-up.

In general, as with the reactor controller 122, tuning parameters or constants define the cooling controller 108 action or output. In sum, cooling controller 108 controls the coolant supply 60A or 60B temperature 144 needed to maintain the reactor temperature 136 at set point of the reactor controller 122, and also works in conjunction with flow controller 98 (FIG. 7) to maintain constant total coolant flow to the reactor jackets. Cooling controller 108 adjusts (block 148) the position of coolant valve 112.

Lastly, some configurations of cooling/coolant systems for polyolefin loop reactors may employ a second cooler valve disposed in parallel with cooler valve 112 (FIG. 7). This second valve may not be a spare but instead sized differently than the first. The two valves may accommodate uncertainty or wide design basis in the reactor temperature control.

Figure 9:
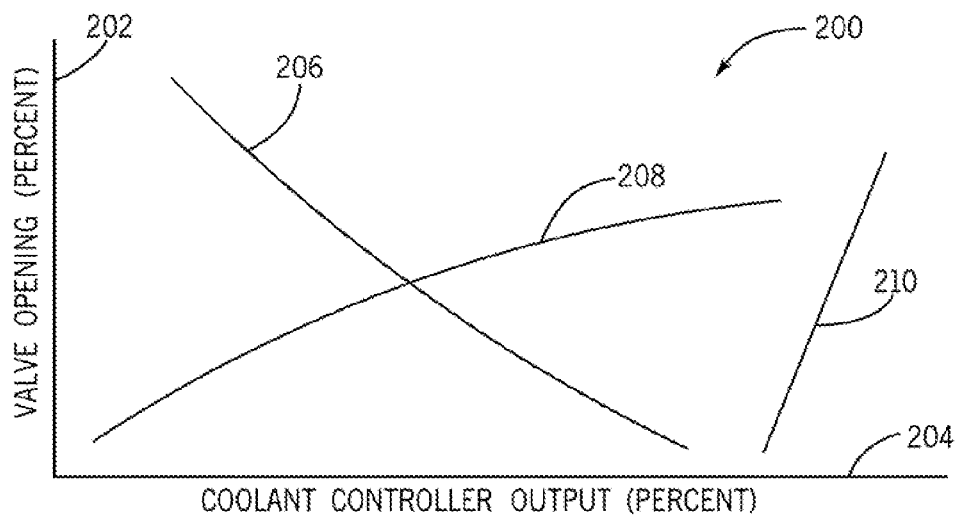
FIG. 9 is an exemplary plot of valve openings of three control valves versus controller output for the three valves in the cooling system in accordance with embodiments of the present techniques.

FIG. 9 is an exemplary plot 200 of system performance curves. The y-axis 202 is valve opening (%), and the x-axis 204 is coolant controller 108 output 110 (%). The three curves 206, 208, and 210 represent operating data for three control valves in the cooling system 58. Curve 206 represents an example of the performance for the cooler valve 108 (FIG. 7), which may be the most significant valve in the control scheme in certain embodiments. Curve 208 represents an example of the performance of the cooler bypass valve 118 (FIG. 7), which is also used as the heater valve on start-up. Curve 210 represents an example of the performance for steam supply valve 116, which should generally only open during start-up of the reactor when heat is needed.

In certain examples to generate the system performance curves, steady state simulations that vary operating conditions, such as production rate, reactor temperature, reactor slurry density, and temperature of cooling tower water supply may be run. A percent open value for each valve in each simulation run is calculated and plotted versus the coolant controller output (in percent). The overall objective in the development of these curves may be to linearize the controller output with the reactor polyolefin production rate or the reactor coolant duty requirements, and so on. An example basis for setting the controller values is: 0% to 34% controller output for maximum cooling and reactor foul; 35% to 74% controller output for startup and normal polyethylene production; and 75% to 100% controller output for the heating zone and startup.

In this example, increasing coolant controller output (sent via signal 110) correlates linearly with lessening heat generation in the reactor. As controller output 110 increases, it reduces the flow through the cooler valve 108 to increase the reactor coolant supply temperature and also increases the flow through the cooler bypass valve 118 to balance the hydraulics to maintain a constant total coolant rate. Further increases in the coolant controller output 110 cross into a region that represents start-up of the reactor, where the coolant system may supply heat to the reactor. In other words, as indicated the coolant controller output 110 has an inverse relationship with heat generation in the reactor. Therefore, the high end of the coolant controller output in this example relates to low or no heat generation in the reactor, such as during startup when heat is supplied to the reactor. Curve 210 represents the steam valve opening during start-up, i.e., at the high region of the x-axis 104 for coolant controller output. In this example, a 100% output on the coolant controller represents the initial phase of start-up, requiring the most demand for steam via valve 116 and the most demand for flow through the heater 84 (and cooler bypass valve 118). The system performance curves 200 may be input into a DCS calculation block, and use in conjunction with tuning constants of the reactor and coolant controllers.

Figure 10:
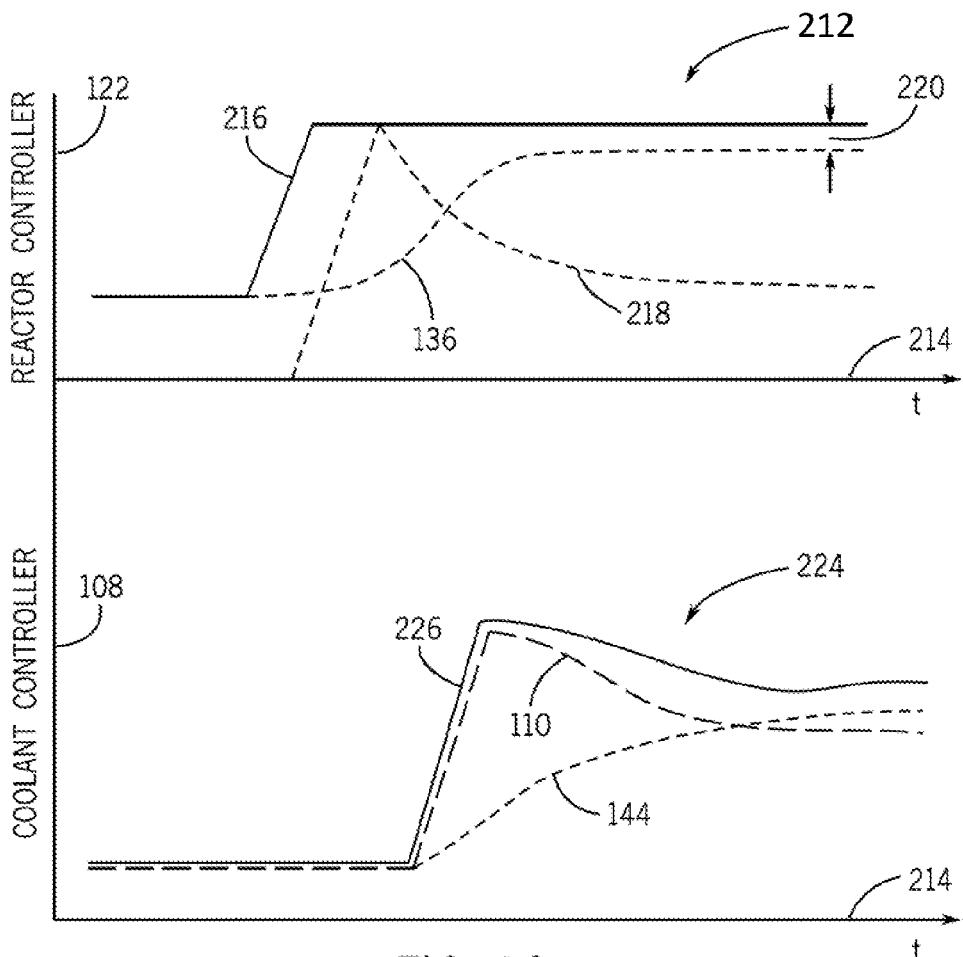
FIG. 10 are exemplary plots showing a change in reactor temperature set point and the resulting output of the reactor temperature controller and coolant controller in the cooling system in accordance with embodiments of the present techniques.

FIG. 10 is two plots 212 and 224 illustrating a cascaded scheme of the reactor controller 122 to the coolant controller 108. The two plots are: an exemplary plot 212 of the reactor controller 122 variables over time (axis 214); and an exemplary plot 224 of the coolant controller 108 variables over the same time (axis 214). The upper plot 212 may represent a simulated reactor controller 122 in an existing plant or new plant design. The lower plot 224 may represent a simulated coolant controller 108 in an existing plant or new plant design.

In the plot 212 for the reactor controller 122, the process input to the controller 122 is the actual reactor temperature 136. The reactor temperature set point 216 is entered by the operator. The reactor controller output (control action 218) writes new coolant supply temperature set points to the coolant controller 108. In this illustrated example of FIG. 10, the reactor temperature set point 216 in reactor controller 122 is changed from 218.0° F. to 218.5° F. The 0.5° F. is ramped over 2 minutes. The actual reactor temperature 136 increases in response to control action 218 increasing the coolant temperature set point. The reactor temperature 136 increases to match the reactor temperature set point. The gain (K1) tuning constant is generally tuned to optimize the amplitude of the control action 218 and/or reactor temperature 136 response. Any offset 220 (or bias) may be mitigated by adjusting the integral reset (T1) tuning constant, for example.

As for the plot 224 for the coolant controller 108, the input to the controller 108 is the actual temperature 144 of the coolant supply 60A (or coolant 60B if controller 108 is for the second reactor 50B). The coolant supply temperature set point 226 is supplied by the reactor controller 122 output 218 (from plot 212). The coolant controller 108 (output 110) adjusts the valve opening positions of the one or more control valves in the coolant system to control the coolant supply temperature. In the same example as plot 212, the coolant controller 108 receives new set points 226 (corresponding to output 218) from the reactor controller 122. The actual coolant supply temperature 144 changes in response to coolant control action 110 of the coolant control 108 to match the set point 226 (of the coolant controller for the coolant supply temperature) received from the reactor controller 122. The ultimate effect of the coolant controller 108 may be to operate in cascade scheme with the reactor controller 122 to maintain the reactor temperature 136 at set point 216 (plot 212).

Figure 11:
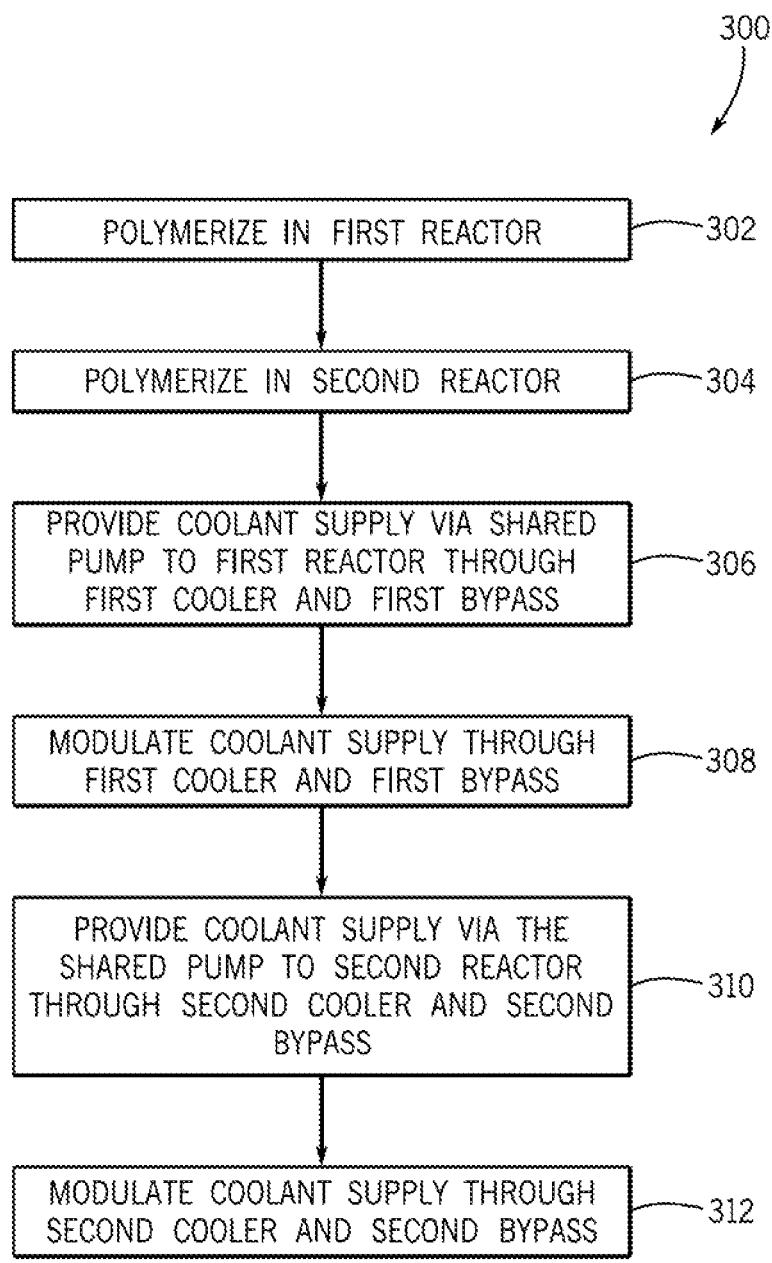
FIG. 11 is a block flow diagram of a method of controlling reactor temperature in a polyolefin reactor system having multiple polymerization reactors.

FIG. 11 is a method 300 of controlling reactor temperature in a reactor system having multiple polymerization reactors (e.g., liquid-phase reactors, loop reactors, autoclave reactors, etc.) for polyolefin production. In producing polyolefin, an olefin is polymerized (block 302) in a first reactor to form a first polyolefin, and an olefin is polymerized (block 304) in a second reactor to form a second polyolefin. The polymerization reactors may be arranged in series or parallel. As the polymerization is typically exothermic, coolant is supplied to the reactors (e.g., to jackets of the reactors) to facilitate control of reactor temperature of the reactors.

In the illustrated method, coolant supply is provided (block 306) via a shared coolant pump to the first reactor through a first cooler and also through a first bypass line disposed operationally in parallel to the first cooler. While the total flow rate of the coolant supply to the first reactor may be maintained substantially constant, the respective flow rates of coolant supply flowing through the first cooler and first bypass line are generally modulated (block 308) to give a temperature of the coolant supply to the first reactor desired for maintaining the first reactor temperature.

More coolant supply flow through first cooler and less coolant supply flow through the first bypass line generally provides more cooling of the coolant supply to the first reactor. Such may be performed if the reactor temperature of the first reactor has exceeded set point. On the other hand, less coolant flow through the first cooler and more coolant supply flow through the first bypass line generally provides less cooling of the coolant supply to the first reactor. Such may be performed when the reactor temperature of the first reactor has fallen below set point.

Further, coolant supply is provided (block 310) with the same shared coolant pump to the second reactor through a second cooler and also through a second bypass line disposed operationally in parallel to the second cooler. While the total flow rate of the coolant supply to the second reactor may be maintained generally constant, the respective flow rates of coolant supply flowing through the second cooler and second bypass line are generally modulated (block 312) to give a desired temperature of the coolant supply to the second reactor for maintaining the second reactor temperature.

More coolant supply flow through the second cooler and less coolant supply flow through the second bypass line generally provides more cooling of the coolant supply to the second reactor. Such may be performed if the reactor temperature of the second reactor has exceeded set point. On the other hand, less coolant flow through the second cooler and more coolant supply flow through the second bypass line generally provides less cooling of the coolant supply to the second reactor. Such may be performed when the reactor temperature of the second reactor has fallen below set point, for example.

An advantage of the illustrated method is that a single common or shared coolant pump may be employed in operation to provide coolant supply flow to both reactors, while each reactor (and its coolant supply) has an independent temperature control. Lastly, it should be noted that additional equipment or flow paths may be provided. For example, a common surge tank may be provided. Further, a respective heater may heat respective coolant supply to the reactors, such as during start-up of the reactors. Also, additional bypass lines, as well as flow control valves, may offer additional means of maintaining a consistent flow of coolant supply to the reactors. Further, the common or shared pump typically receives the coolant return from both reactors.

Figure 12:
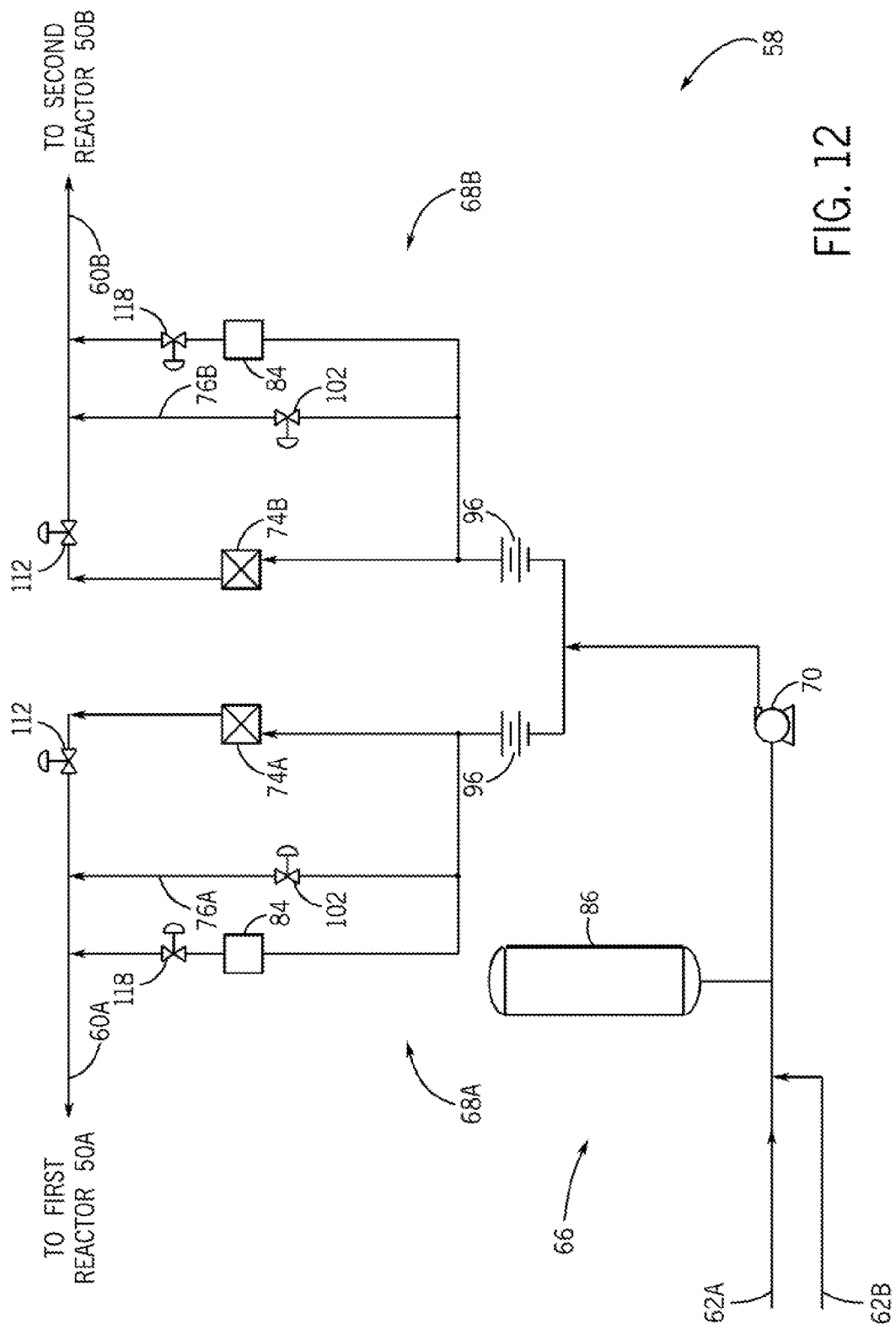
FIG. 12 is a diagrammatical representation of the exemplary cooling system of FIGS. 4-5 in accordance with embodiments of the present techniques.

FIG. 12 is an exemplary cooling system 58 having the common section 66 and the individual sections 68A and 68B, and that supplies coolant to first reactor 50A and second reactor 50B. While it has been stated that the foregoing discussion of the individual section 68A and the first loop reactor 50A may equally apply to the individual section 68B and the second loop reactor 50B, FIG. 12 is provided to further emphasize such.

As indicated in FIG. 12, the individual sections 68A and 68B may be similar or identical. The section 68A has the coolant cooler 74A and flow bypass line 76A. The section 68B has the coolant cooler 74B and flow bypass line 76B. The sections 68A and 68B each have a flow measurement orifice 96, control valves 102, 112, 118, and a heater 84. Further, the sections 68A and 68B each have the aforementioned controllers 98, 108, and 122, which are not depicted.

It should be noted that the coolant system 58 and its individual sections 68A and 68B, and their control, do not merely only involve a mere duplication of parts. The present techniques beneficially and uniquely provide for a common or shared motive force of the coolant circulation with dedicating cooling and temperature control for the respective reactor. The coolant flow hydraulics are effectively balanced among the respective reactors and their reactor jackets. For instant, the tuning constants for the controller 98 and flow control valve 102 are determined and adjusted to address potential more activity of this flow control loop in maintaining constant coolant flow to the respective reactors and for effective operation of the coolant pump 70. Further, the tuning and other factors of the additional controllers in the cooling system 58 are also adjusted as needed.

It should also be noted that the pump 70 may be the only operational pump in the coolant system 58. In certain embodiments, the pump 70 is the only pump in the coolant system 58, in that a spare or standby pump is not provided, as pump reliability may be high in water service. Advantageously, in these cases of no standby or spare pump for pump 70, capital costs may be reduced.

Figure 13:
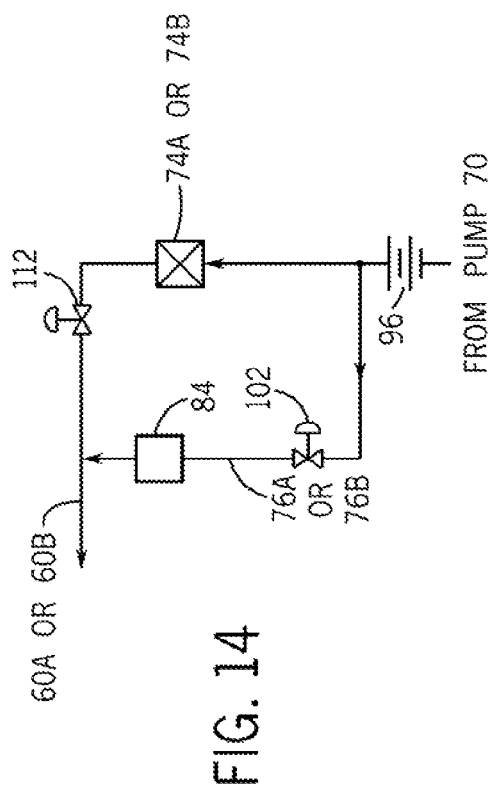
FIGS. 13-16 are alternate embodiments of a portion of the exemplary cooling system of FIGS. 4-5 in accordance with embodiments of the present techniques.

FIGS. 13-16 provide embodiments of the individual section 68A or 68B with specific regard to the heater 84 and bypass lines. As stated above, the heater 84 may be disposed on various conduits in these sections. FIG. 13 depicts the section 68A or 68B without a heater 84. In this exemplary case, heating for the reactor 50A or 50B during startup is provided by means other than a heater 84.

Figure 14:
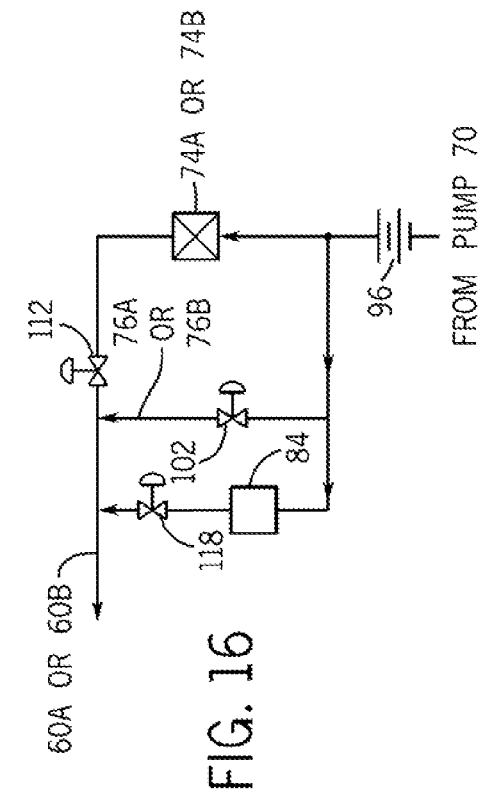

FIG. 14 depicts the heater 84 disposed on the flow bypass line 76A or 76B. A separate bypass or heater line is not employed. During normal operation with the cooling system 58 removing heat from the reactor 50A or 50B, no heating medium or steam is supplied to the heater 84. Therefore, during cooling, the heater is "turned off" and coolant merely flows through the heater 84 without being heated.

Figure 15:
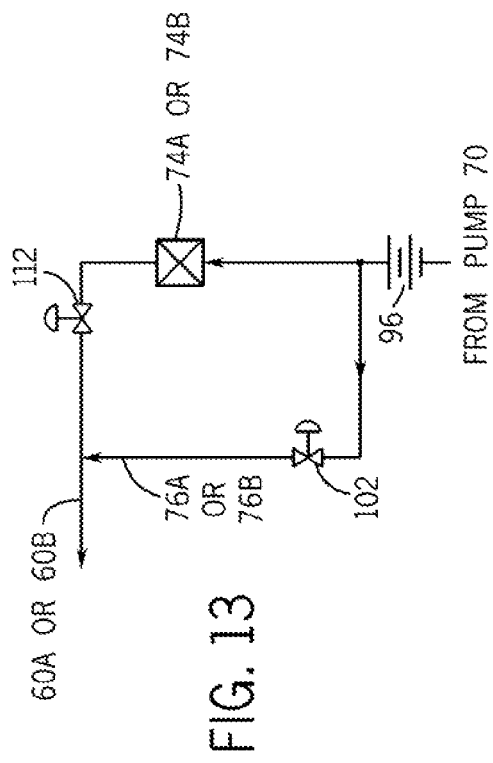
Figure 16:
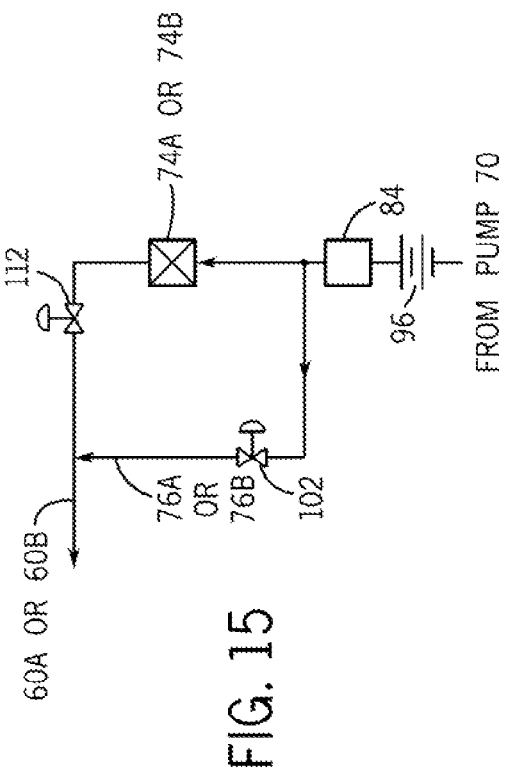

FIG. 15 is similar to FIG. 14 except that the heater is disposed upstream of the cooler 74A or 74B and the flow bypass line 76A or 76B. As with the embodiment of FIG. 14, during normal operation with the cooling system 58 removing heat from the reactor 50A or 50B, no heating medium or steam is supplied to the heater 84. For the sake of comparison, FIG. 16 gives the embodiment presented in FIG. 7.

Lastly, in one example, the total coolant flow discharging from the pump 70 for a two-reactor system is about 6000 metric tons per hour (MT/hr). In certain instances, the coolant flow to each reactor may be about 3000 MT/hr. In certain embodiments, exemplary production rates of example polyolefins (e.g., some polyethylene resins) for the two-reactor system may be in the range of about 50 MT/hr to about 90 MT/hr, and with about 25 MT/hr to about 45 Mt/hr in each reactor, for example. In examples, the capacity ratio of the first reactor polyolefin production to the second reactor polyolefin production is may be about 0.5:1 and 1.3:1, depending on turn-down and design considerations, for instance. In a two-reactor system, exemplary weight ratios of total polyolefin production rate (both reactors) to total coolant flow (total discharging from the pump 70 to both reactors) may be about 0.004, 0.005, 0.006, 0.007, and 0.008. Similarly, in the two reactor system, exemplary ratios of polyolefin production rate (per reactor) to coolant flow (per reactor, i.e., combined through a cooler and its bypass or bypasses) may be about 0.004, 0.005, 0.006, 0.007, and 0.008. Of course, in other examples, different values for coolant flow rates, polyolefin production rates, and the aforementioned ratios may be employed.

IV. Summary

Embodiments of the present techniques provide for a polyolefin reactor temperature control system including a first reactor temperature control path for: a first control feed stream (e.g., water) to split into at least (1) a first cooler zone feed stream to pass through a first cooler zone to produce a first cooler zone output stream and (2) a first cooler zone bypass stream; a first treated stream having a first treated stream temperature and including the first cooler zone output stream and the first cooler zone bypass stream; and a first recycle stream which is the first treated stream after the first treated stream has exchanged energy with a first polyolefin reactor. The temperature control system further includes a second reactor temperature control path for: a second control feed stream to split into at least (1) a second cooler feed stream to pass through a second cooler zone to produce a second cooler zone output stream and (2) a second cooler zone bypass stream; a second treated stream having a second treated stream temperature and including the second cooler zone output stream and the second cooler zone bypass stream; and a second recycle stream which is the second treated stream after the second treated stream has exchanged energy with a second polyolefin reactor. The first and second cooler zones may each include one or more coolers (e.g., one, two, four, etc.) such as one or more plate-and-frame heat exchangers. Lastly, the reactor temperature control system also includes a shared temperature control path configured to: combine the first and second recycle streams to form a combined recycle stream; process the combined recycle stream through shared system equipment to form a shared output stream; and split the shared output stream into the first control feed stream and the second control feed stream.

The reactor temperature control system may include a first treated stream control system configured to control the first treated stream temperature by manipulating flow rates of one or more of the following: the first cooler zone feed or output streams or the first cooler zone bypass stream. Likewise, the reactor temperature control may include a second treated stream control system configured to control the second treated stream temperature by manipulating flow rates of one or more of the following: the second cooler zone feed or output streams or the second cooler zone bypass stream.

Additionally, the first control feed stream may be further configured to be split into a first heater zone feed stream to pass through a first heater (e.g., shell and tube, sparger, pick heater, etc.) zone to produce a first heater zone output stream, and wherein the first treated stream further has the first heater zone output stream. In this case, the first treated stream control system may be configured to control the first treated stream temperature by manipulating flow rates of one or more of the following: the first cooler zone feed or output streams, the first cooler zone bypass stream, or the first heater zone feed or output streams.

Similarly, the second control feed may be further split into a second heater zone feed stream configured to pass through a second heater zone to produce a second heater zone output stream, and wherein the second treated stream further has the second heater zone output stream. A second treated stream control system may be configured to control the second treated stream temperature by manipulating flow rates of one or more of the following: the second cooler zone feed or output streams, the second cooler zone bypass stream, or the second heater zone feed or output streams.

On the other hand, the first cooler zone bypass stream may be configured to be routed through a first heater zone. In this case, the first control feed stream may be further configured to be split into a first secondary bypass stream through a flow control valve, and wherein the first treated stream further has the first secondary bypass stream. Likewise, the second cooler zone bypass stream may be configured to be routed through a second heater zone. In this case, the second control feed stream may be further configured to be split into a second secondary bypass stream to through a flow control valve, and wherein the second treated stream further comprises the second secondary bypass stream.

It should be noted that a heater zone may instead be disposed in other positions. For instance, the first control feed stream may be configured to pass through a first heater zone before being split into at least the first cooler zone feed stream and the first cooler zone bypass stream. Similarly, the second control feed stream is further configured to pass through a second heater zone before being split into at least the second cooler zone feed stream and the second cooler zone bypass stream.

The shared system equipment may include a coolant pump (e.g., a centrifugal pump) configured to provide both the first control feed and the second control feed. Indeed, the coolant pump may be configured to simultaneously provide the first control feed and the second control feed. Further, the shared system equipment may include a surge tank.

In operation, the first reactor temperature may be controlled within 1.0° F. of a first reactor temperature set point, within 0.5° F. of a first reactor temperature set point, and/or within 0.25° F. of a first reactor temperature set point, for example. The first recycle stream and the first treatment stream have a temperature difference of at least 10° F., at least 25° F., and/or at least 40° F. In certain examples, the first reactor may operate with a ratio of reactor production output to first treated stream flow rate of greater than 0.004. Similarly, the second reactor may operate with a ratio of reactor production output to the second treated stream flow rate of greater than 0.004.

Additionally, in certain embodiments, the first and second reactors have a combined production output and wherein the shared output stream has a shared output stream flow rate such that a ratio of the combined reactor production output to shared output stream flow rate is greater than 0.004 pounds polyethylene per pound of coolant (treated water). Lastly, the first reactor and the second reactor may have a first to second reactor capacity ratio of between 0.5:1 and 1.3:1, for example. In other words, the polyolefin production ratio between two reactors may be varied between 0.5 to 1.3 as theoretical or practical limits in certain examples. In some instances, the lower 0.5 indicates the turn down capability and the upper 1.3 may be an upper design limit.

Embodiments of the present techniques may also provide a method of controlling reactor temperature, including: splitting a first control feed stream into at least (1) a first cooler zone feed stream through a first cooler zone to produce a first cooler zone output stream and (2) a first cooler zone bypass stream; combining the first cooler zone output stream and the first cooler zone bypass stream to give a first treated stream having a first treated stream temperature; and recycling a first return stream which is the first treated stream after the first treated stream has exchanged energy with a first polyolefin reactor. The method may further include splitting a second control feed stream into at least (1) a second cooler zone feed stream through a second cooler zone to produce a second cooler zone output stream and (2) a second cooler zone bypass stream; combining the second cooler zone output stream and the second cooler zone bypass stream to give a second treated stream having a second treated stream temperature; and recycling a second return stream which is the second treated stream after the second treated stream has exchanged energy with a second polyolefin reactor. Lastly, the method may include: combining the first and second return streams to form a combined return stream; processing the combined return stream through shared system equipment to form a shared output stream; and splitting the shared output stream into the first control feed and the second control feed.

The shared system equipment may include a coolant pump, and wherein the shared output stream is a discharge stream from the coolant pump. Moreover, the method may include adjusting the first treated stream temperature by manipulating flow rates of one or more of the following: the first cooler zone feed or output streams or the first cooler zone bypass stream. Likewise, the method may include adjusting the second treated stream temperature by manipulating flow rates of one or more of the following: the second cooler zone feed or output streams or the second cooler zone bypass stream.

Further, the method may routing the first cooler zone bypass stream through a first heater zone prior to combining the first cooler zone bypass stream with the first cooler zone output stream. If so, the method may include further splitting the first control feed stream into a first secondary bypass stream through a flow control valve, and combining the first secondary bypass stream with the first cooler zone output stream and the first cooler zone bypass stream to give the first treated stream having the first treated stream temperature. Similarly, the method may route the second cooler zone bypass stream through a second heater zone prior to combining the second cooler zone bypass stream with the second cooler zone output stream. If so, the method may further split the second control feed stream into a second secondary bypass stream through a flow control valve, and combine the second secondary bypass stream with the second cooler zone output stream and the second cooler zone bypass stream to give the second treated stream having the second treated stream temperature.

The method may include further splitting the first control feed stream into (3) a first heater zone feed stream through a first heater zone to produce a first heater zone output stream, and combining the first heater zone output stream with the first cooler zone output stream and the first cooler zone bypass stream to give the first treated stream having the first treated stream temperature. In this case, the method may adjust the first treated stream temperature by manipulating flow rates of one or more of the following: the first cooler zone feed or output streams, the first cooler zone bypass stream, or the first heater zone feed or output streams. Similarly, the method may split the second control feed stream into (3) a second heater zone feed stream through a second heater zone to produce a second heater zone output stream, and combine the second heater zone output stream with the second cooler zone output stream and the second cooler zone bypass stream to give the second treated stream having the second treated stream temperature. Thus, the method may adjust the second treated stream temperature by manipulating flow rates of one or more of the following: the second cooler zone feed or output streams, the second cooler zone bypass stream, or the second heater zone feed or output streams.

Embodiments of the present techniques may provide a polyolefin reactor system, having a total reactor system production rate, the reactor system including: a first polymerization reactor having a first reactor production rate; a second polymerization reactor having a second reactor production rate; and a reactor temperature control system having a first reactor temperature control path, a second reactor temperature control path, and a shared temperature control path comprising a pump having a single pump discharge rate split between the first reactor temperature control path and the second temperature control path, wherein a ratio of the total reactor system production rate to the single pump discharge rate is greater than 0.004, for example. The first temperature control path includes a first cooler, and the second temperature control path includes a second cooler. Further, the reactor system includes a first coolant controller associated with the first temperature control path, and a second coolant controller associated with the second temperature control path.

Embodiments of the present technique provide for a reactor system including, a first polyolefin reactor, a second polyolefin reactor, and a reactor temperature control system having a coolant pump. The coolant pump may be configured to: provide coolant supply to the first polyolefin reactor through a first cooler and a first bypass line disposed operationally in parallel to the first cooler; provide coolant supply to the second polyolefin reactor through a second cooler and a second bypass line disposed operationally in parallel to the second cooler; and receive coolant return from the first polyolefin reactor and coolant return from the second polyolefin reactor. Of course, the reactor temperature control system can include the first cooler, the first bypass line, the second cooler, and the second bypass line. The first cooler and the second cooler may each be a plurality of plate-and-frame heat exchangers, for example.

The reactor temperature control system may be configured to maintain a substantially constant flow rate of coolant supply to the first polyolefin reactor, and to maintain a substantially constant flow rate of coolant supply to the second polyolefin reactor. A first flow element configured to measure flow rate of the coolant supply provided via the coolant pump to the first polyolefin reactor. Likewise, a second flow element configured to measure flow rate of coolant supply provided via the coolant pump to the second polyolefin reactor.

The reactor temperature control system may include: a first cooler valve configured to modulate coolant supply flow through the first cooler to the first polyolefin reactor: a first bypass valve configured to modulate coolant supply flow through the first bypass line to the first polyolefin reactor; a second cooler valve configured to modulate coolant supply flow through the second cooler to the second polyolefin reactor; and a second bypass valve configured to modulate coolant supply flow through the second bypass line to the first polyolefin reactor. A first coolant controller may be configured to specify percent valve opening of the first cooler valve and percent valve opening of the first bypass valve. A second coolant controller may be configured specify percent valve opening of the second cooler valve and percent valve opening of the second bypass valve. Further, a first reactor temperature controller may be configured to provide a set point to the first coolant controller. A second reactor temperature controller may be configured to provide a set point to the second coolant controller. The reactor temperature control system may include a surge vessel to provide surge capacity in circulation of coolant supply to, and coolant return from, the first and second polyolefin reactors.

Further, the reactor temperature control system may include a first heater disposed along the first bypass line, and a second heater disposed along the second bypass line. If so, a first secondary bypass line may be disposed operationally in parallel with the first bypass line and the first cooler. A second secondary bypass line may be disposed operationally in parallel with the second bypass line and the second cooler. The coolant pump may be configured to provide coolant supply to the first polyolefin reactor through the first cooler, the first bypass line, and the first secondary bypass line, and to provide coolant supply to the second polyolefin reactor through the second cooler, the second bypass line, and the second secondary bypass line. A first flow control valve may be disposed along the first secondary bypass line, and a second flow control valve may be disposed along the second secondary bypass line.

Lastly, embodiments of the present techniques may provide a method including: polymerizing olefin in a first reactor to form a first polyolefin; polymerizing olefin in a second reactor to form a second polyolefin; providing coolant supply via a coolant pump to the first reactor through a first cooler and a first bypass line disposed operationally in parallel to the first cooler; providing coolant supply via the coolant pump to the second reactor through a second cooler and a second bypass line disposed operationally in parallel to the first cooler; and receiving coolant return at the coolant pump from the first and second reactors. The method may include maintaining substantially constant a flow rate of coolant supply to the first reactor, and maintaining substantially constant a flow rate of coolant supply to the second reactor. Further, the method may include modulating flow rate of coolant supply through the first cooler, modulating flow rate of coolant supply through the first bypass line, modulating flow rate of coolant supply through the second cooler, and modulating flow rate of coolant supply through the second bypass line.

The method may include: controlling reactor temperature of the first reactor, comprising specifying percent valve opening of a first cooler valve modulating coolant supply flow through the first cooler, and specifying percent valve opening of a first bypass valve modulating coolant supply flow through the first bypass line; and controlling reactor temperature of the second reactor, comprising specifying percent valve opening of a second cooler valve modulating coolant supply flow through the second cooler, and specifying percent valve opening of a second bypass valve modulating coolant supply flow through the second bypass line. Moreover, the method may include: determining reactor temperature of the first reactor, and designating a set point of a first coolant controller that specifies percent valve openings for a first cooler valve and a first bypass valve; and determining reactor temperature of the second reactor, and designating a set point of a second coolant controller that specifies percent valve openings of a second cooler valve and a second bypass valve.

Furthermore, the first bypass line may include a first heater, and the second bypass line may include a second heater. Coolant supply is further provided via the coolant pump to the first reactor through a first secondary bypass line, and coolant supply further provided via the coolant pump to the second reactor through a second secondary bypass line.

What is claimed is:

1. A polyolefin reactor temperature control system comprising:
   (a) a first reactor temperature control path for:
      a first control feed stream to split into at least (1) a first cooler zone feed stream to pass through a first cooler zone to produce a first cooler zone output stream and (2) a first cooler zone bypass stream;
      a first treated stream having a first treated stream temperature and comprising the first cooler zone output stream and the first cooler zone bypass stream; and
      a first recycle stream comprising the first treated stream after the first treated stream has exchanged energy with a first polyolefin reactor;
   (b) a second reactor temperature control path for:
      a second control feed stream to split into at least (1) a second cooler feed stream to pass through a second cooler zone to produce a second cooler zone output stream and (2) a second cooler zone bypass stream;
      a second treated stream having a second treated stream temperature and comprising the second cooler zone output stream and the second cooler zone bypass stream; and
      a second recycle stream comprising the second treated stream after the second treated stream has exchanged energy with a second polyolefin reactor; and
   (c) a shared temperature control path configured to:
      combine the first and second recycle streams to form a combined recycle stream;
      process the combined recycle stream through shared system equipment to form a shared output stream; and
      split the shared output stream into the first control feed stream and the second control feed stream.

2. The reactor temperature control system of claim 1, further comprising a first treated stream control system configured to adjust the first treated stream temperature by manipulating flow rates of one or more of the following: the first cooler zone feed stream, the first cooler zone output stream, or the first cooler zone bypass stream.

3. The reactor temperature control system of claim 1, further comprising a second treated stream control system configured to adjust the second treated stream temperature by manipulating flow rates of one or more of the following: the second cooler zone feed stream, the second zone output stream, or the second cooler zone bypass stream.

4. The reactor control system of claim 1, wherein the first control feed stream is further configured to be split into a first heater zone feed stream to pass through a first heater zone to produce a first heater zone output stream, and wherein the first treated stream further comprises the first heater zone output stream.

5. The reactor temperature control system of claim 4, further comprising a first treated stream control system configured to adjust the first treated stream temperature by manipulating flow rates of one or more of the following: the first cooler zone feed stream, first cooler zone output stream, the first cooler zone bypass stream, the first heater zone feed stream, or the first heater zone output stream.

6. The reactor control system of claim 4, wherein the first heater zone comprises a sparger or a shell-and-tube exchanger, or a combination thereof.

7. The reactor control system of claim 1, wherein the second control feed is further configured to be split into a second heater zone feed stream configured to pass through a second heater zone to produce a second heater zone output stream, and wherein the second treated stream further comprises the second heater zone output stream.

8. The reactor temperature control system of claim 7, further comprising a second treated stream control system configured to adjust the second treated stream temperature by manipulating flow rates of one or more of the following: second cooler zone feed stream, the second cooler zone output stream, the second cooler zone bypass stream, the second heater zone feed stream, or the second heater zone output stream.

9. The reactor control system of claim 1, wherein the first reactor temperature control path is further configured to route the first cooler zone bypass stream through a first heater zone.

10. The reactor control system of claim 9, wherein the first reactor temperature control path is configured to further split the first control feed stream into a first secondary bypass stream through a flow control valve, and wherein the first treated stream further comprises the first secondary bypass stream.

11. The reactor control system of claim 1, wherein the second reactor temperature control path is configured to route the second cooler zone bypass stream through a second heater zone.

12. The reactor control system of claim 11, wherein the second reactor temperature control path is configured to further split the second control feed stream into a second secondary bypass stream to through a flow control valve, and wherein the second treated stream further comprises the second secondary bypass stream.

13. The reactor temperature control system of claim 1, wherein the first reactor temperature control path is configured to pass the first control feed stream through a first heater zone before being split into at least the first cooler zone feed stream and the first cooler zone bypass stream.

14. The reactor temperature control system of claim 1, wherein the second reactor temperature control path is configured to pass the second control feed stream through a second heater zone before being split into at least the second cooler zone feed stream and the second cooler zone bypass stream.

15. The reactor temperature control system of claim 1, wherein the shared system equipment comprises a coolant pump configured to provide the shared output stream.

16. The reactor temperature control system of claim 15, wherein the coolant pump is a centrifugal pump.

17. The reactor temperature control system of claim 1, wherein the shared system equipment comprises a coolant pump configured to simultaneously provide the first control feed and the second control feed.

18. The reactor temperature control system of claim 1, wherein the shared system equipment comprises a surge tank fluidically connected to a coolant pump.

19. The reactor temperature control system of claim 1, wherein the first control feed stream comprises water.

20. The reactor temperature control system of claim 1, wherein the first reactor temperature is controlled within 0.5° F. of a first reactor temperature set point.

21. The reactor temperature control system of claim 1, wherein the first reactor temperature is controlled within 0.25° F. of a first reactor temperature set point.

22. The reactor temperature control system of claim 1, wherein the first cooler zone comprises at least two coolers.

23. The reactor temperature control system of claim 1, wherein the first cooler zone comprises at least four coolers.

24. The reactor temperature control system of claim 1, wherein the first recycle stream and the first treatment stream have a temperature difference of at least 10° F.

25. The reactor temperature control system of claim 1, wherein the first recycle stream and the first treatment stream have a temperature difference of at least 25° F.

26. The reactor temperature control system of claim 1, wherein the first recycle stream and the first treatment stream have a temperature difference of at least 40° F.

27. The reactor temperature control system of claim 1, wherein the first reactor has a first reactor production output and wherein the first treated stream has a first treated stream flow rate such that a ratio of the first reactor production output and first treated stream flow rate is greater than 0.004 based on weight.

28. The reactor temperature control system of claim 1, wherein the second reactor has a second reactor production output and wherein the second treated stream has a second treated stream flow rate such that a weight ratio of the second reactor production output and second treated stream flow rate is greater than 0.004 based on weight.

29. The reactor temperature control system of claim 1, wherein the first and second reactors have a combined production output and wherein the shared output stream has a shared output stream flow rate such that a ratio of the combined production output and shared output stream flow rate is greater than 0.004 based on weight.

30. The reactor temperature control system of claim 1, wherein the first reactor and the second reactor have a first to second reactor capacity ratio of between 0.5:1 and 1.3:1.

31. A method of controlling reactor temperature, comprising:
splitting a first control feed system into at least (1) a first cooler zone feed stream through a first cooler zone to produce a first cooler zone output stream and (2) a first cooler zone bypass stream;
combining the first cooler zone output stream and the first cooler zone bypass stream to give a first treated stream having a first treated stream temperature;
recycling a first return stream comprising the first treated stream after the first treated stream has exchanged energy with a first polyolefin reactor;
splitting a second control feed stream into at least (1) a second cooler zone feed stream through a second cooler zone to produce a second cooler zone output stream and (2) a second cooler zone bypass stream;
combining the second cooler zone output stream and the second cooler zone bypass stream to give a second treated stream having a second treated stream temperature;
recycling a second return stream comprising the second treated stream after the second treated stream has exchanged energy with a second polyolefin reactor;
combining the first and second return streams to form a combined return stream;
processing the combined return stream through shared system equipment to form a shared output stream; and
splitting the shared output stream into the first control feed and the second control feed.

32. The method of claim 31, wherein the shared system equipment comprises a coolant pump, and wherein the shared output stream is a discharge stream from the coolant pump.

33. The method of claim 31, comprising adjusting the first treated stream temperature by manipulating flow rates of one or more of the following: the first cooler zone feed stream, the first cooler zone output stream, or the first cooler zone bypass stream.

34. The method of claim 31, comprising adjusting the second treated stream temperature by manipulating flow rates of one or more of the following: the second cooler zone feed, the second cooler zone output stream, or the second cooler zone bypass stream.

35. The method of claim 31, comprising routing the first cooler zone bypass stream through a first heater zone prior to combining the first cooler zone bypass stream with the first cooler zone output stream.

36. The method of claim 35, comprising further splitting the first control feed stream into a first secondary bypass stream through a flow control valve, and combining the first secondary bypass stream with the first cooler zone output stream and the first cooler zone bypass stream to give the first treated stream having the first treated stream temperature.

37. The method of claim 31, comprising routing the second cooler zone bypass stream through a second heater zone prior to combining the second cooler zone bypass stream with the second cooler zone output stream.

38. The method of claim 37, comprising further splitting the second control feed stream into a second secondary bypass stream through a flow control valve, and combining the second secondary bypass stream with the second cooler zone output stream and the second cooler zone bypass stream to give the second treated stream having the second treated stream temperature.

39. The method of claim 31, comprising further splitting the first control feed stream into (3) a first heater zone feed stream through a first heater zone to produce a first heater zone output stream, and combining the first heater zone output stream with the first cooler zone output stream and the first cooler zone bypass stream to give the first treated stream having the first treated stream temperature.

40. The method of claim 39, comprising adjusting the first treated stream temperature by manipulating flow rates of one or more of the following: the first cooler zone feed stream, the first cooler zone output stream, the first cooler zone bypass stream, the first heater zone feed stream, or the first heater zone output stream.

41. The method of claim 31, comprising further splitting the second control feed stream into (3) a second heater zone feed stream through a second heater zone to produce a second heater zone output stream, and combining the second heater zone output stream with the second cooler zone output stream and the second cooler zone bypass stream to give the second treated stream having the second treated stream temperature.

42. The method of claim 41, comprising adjusting the second treated stream temperature by manipulating flow rates of one or more of the following: the second cooler zone feed stream, the second cooler zone output stream, the second cooler zone bypass stream, the second heater zone feed stream, or the second heater zone output stream.

43. A polyolefin reactor system, having a total reactor system production rate, comprising:
a first polymerization reactor having a first reactor production rate;
a second polymerization reactor having a second reactor production rate; and
a reactor temperature control system comprising a first reactor temperature control path, a second reactor temperature control path, and a shared temperature control path comprising a pump having a single pump discharge rate split upstream of the first reactor temperature control path and the second temperature control path, wherein a weight ratio of the total reactor system production rate to the single pump discharge rate is greater than 0.004.

44. The reactor system of claim 43, wherein the first temperature control path comprises a first cooler, and the second temperature control path comprises a second cooler.

45. The reactor system of claim 43, comprising a first coolant controller associated with the first temperature control path, and a second coolant controller associated with the second temperature control path.

46. A reactor system comprising:
a first polyolefin reactor;
a second polyolefin reactor; and
a reactor temperature control system comprising a coolant pump configured to:
provide coolant supply to the first polyolefin reactor through a first cooler and a first bypass line disposed operationally in parallel to the first cooler;
provide coolant supply to the second polyolefin reactor through a second cooler and a second bypass line disposed operationally in parallel to the second cooler; and
receive coolant return from the first polyolefin reactor and coolant return from the second polyolefin reactor.

47. The polyolefin reactor system of claim 46, wherein the reactor temperature control system is configured to maintain a substantially constant flow rate of coolant supply to the first polyolefin reactor, and to maintain a substantially constant flow rate of coolant supply to the second polyolefin reactor.

48. The polyolefin reactor system of claim 46, wherein the reactor temperature control system comprises:
a first cooler valve configured to modulate coolant supply flow through the first cooler to the first polyolefin reactor;
a first bypass valve configured to modulate coolant supply flow through the first bypass line to the first polyolefin reactor;
a second cooler valve configured to modulate coolant supply flow through the second cooler to the second polyolefin reactor; and
a second bypass valve configured to modulate coolant supply flow through the second bypass line to the first polyolefin reactor.

49. The polyolefin reactor system of claim 46, wherein the reactor temperature control system comprises:
a first coolant controller configured to specify percent valve opening of a first cooler valve and percent valve opening of a first bypass valve; and
a second coolant controller configured specify percent valve opening of a second cooler valve and percent valve opening of a second bypass valve.

50. The polyolefin reactor system of claim 49, wherein the reactor temperature control system comprises:
a first reactor temperature controller configured to provide a set point to the first coolant controller; and
a second reactor temperature controller configured to provide a set point to the second coolant controller.

51. The reactor system of claim 46, wherein the first cooler comprises a plurality of plate-and-frame heat exchangers, and the second cooler comprise a plurality of plate-and-frame heat exchangers.

52. The reactor system of claim 46, wherein the first cooler is configured to receive cooling water to lower a temperature of coolant supply flowing through the first cooler, and the second cooler is configured to receive cooling water to lower a temperature of coolant supply flowing through the second cooler.

53. The reactor system of claim 52, wherein the coolant supply comprises treated water, and the cooling water comprises cooling tower water.

54. The polyolefin reactor system of claim 46, wherein the reactor temperature control system comprises a surge vessel to provide surge capacity in circulation of coolant supply to, and coolant return from, the first and second polyolefin reactors.

55. The reactor system of claim 46, wherein the reactor temperature control system comprises a first heater disposed along the first bypass line, and a second heater disposed along the second bypass line.

56. The reactor system of claim 55, wherein the reactor temperature control system comprises:
a first secondary bypass line disposed operationally in parallel with the first bypass line and the first cooler;
a second secondary bypass line disposed operationally in parallel with the second bypass line and the second cooler; and
wherein the coolant pump is configured to provide coolant supply to the first polyolefin reactor through the first cooler, the first bypass line, and the first secondary bypass line, and to provide coolant supply to the second polyolefin reactor through the second cooler, the second bypass line, and the second secondary bypass line.

57. The reactor system of claim 56, wherein the reactor temperature control system comprises a first flow control valve disposed along the first secondary bypass line, and a second flow control valve disposed along the second secondary bypass line.

58. The reactor system of claim 46, wherein the reactor temperature control system comprises:
a first flow element configured to measure flow rate of the coolant supply provided via the coolant pump to the first polyolefin reactor; and
a second flow element configured to measure flow rate of coolant supply provided via the coolant pump to the second polyolefin reactor.

59. A method comprising:
polymerizing olefin in a first reactor to form a first polyolefin;
polymerizing olefin in a second reactor to form a second polyolefin;
providing coolant supply via a coolant pump to the first reactor through a first cooler and
a first bypass line disposed operationally in parallel to the first cooler;
providing coolant supply via the coolant pump to the second reactor through a second cooler and a second bypass line disposed operationally in parallel to the second cooler; and
receiving coolant return at the coolant pump from the first and second reactors.

60. The method of claim 59, comprising maintaining substantially constant a flow rate of coolant supply to the first reactor, and maintaining substantially constant a flow rate of coolant supply to the second reactor.

61. The method of claim 59, comprising modulating flow rate of coolant supply through the first cooler, modulating flow rate of coolant supply through the first bypass line, modulating flow rate of coolant supply through the second cooler, and modulating flow rate of coolant supply through the second bypass line.

62. The method of claim 59, comprising:
controlling reactor temperature of the first reactor, comprising specifying percent valve opening of a first cooler valve modulating coolant supply flow through the first cooler, and specifying percent valve opening of a first bypass valve modulating coolant supply flow through the first bypass line; and
controlling reactor temperature of the second reactor, comprising specifying percent valve opening of a second cooler valve modulating coolant supply flow through the second cooler, and specifying percent valve opening of a second bypass valve modulating coolant supply flow through the second bypass line.

63. The method of claim 59, comprising:
determining reactor temperature of the first reactor;
designating a set point of a first coolant controller that specifies percent valve openings for a first cooler valve and a first bypass valve;
determining reactor temperature of the second reactor; and
designating a set point of a second coolant controller that specifies percent valve openings of a second cooler valve and a second bypass valve.

64. The method of claim 59, wherein the first bypass line comprises a first heater, and the second bypass line comprises a second heater.

65. The method of claim 64, comprising further providing coolant supply via the coolant pump to the first reactor through a secondary bypass line, and further providing coolant supply via the coolant pump to the second reactor through a secondary bypass line.

\* \* \* \* \*